United States Patent
Kawata et al.

(10) Patent No.: US 11,866,800 B2
(45) Date of Patent: Jan. 9, 2024

(54) STEEL SHEET AND METHOD OF MANUFACTURING THE SAME

(71) Applicant: NIPPON STEEL CORPORATION, Tokyo (JP)

(72) Inventors: Hiroyuki Kawata, Tokyo (JP); Kengo Takeda, Tokyo (JP); Mai Nagano, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/786,988

(22) PCT Filed: Dec. 21, 2020

(86) PCT No.: PCT/JP2020/047610
§ 371 (c)(1),
(2) Date: Jun. 17, 2022

(87) PCT Pub. No.: WO2021/140893
PCT Pub. Date: Jul. 15, 2021

(65) Prior Publication Data
US 2023/0047282 A1 Feb. 16, 2023

(30) Foreign Application Priority Data
Jan. 8, 2020 (JP) .................. 2020-001529

(51) Int. Cl.
| | |
|---|---|
| C21D 9/46 | (2006.01) |
| B32B 15/01 | (2006.01) |
| C23C 2/02 | (2006.01) |
| C21D 6/00 | (2006.01) |
| C21D 8/02 | (2006.01) |
| C22C 38/00 | (2006.01) |
| C22C 38/02 | (2006.01) |
| C22C 38/04 | (2006.01) |
| C22C 38/06 | (2006.01) |
| C22C 38/08 | (2006.01) |
| C22C 38/12 | (2006.01) |
| C22C 38/16 | (2006.01) |
| C22C 38/28 | (2006.01) |
| C23C 2/06 | (2006.01) |
| C23C 2/28 | (2006.01) |
| C23C 2/40 | (2006.01) |

(52) U.S. Cl.
CPC .............. *C21D 9/46* (2013.01); *B32B 15/013* (2013.01); *C21D 6/001* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/16* (2013.01); *C22C 38/28* (2013.01); *C23C 2/022* (2022.08); *C23C 2/06* (2013.01); *C23C 2/28* (2013.01); *C23C 2/40* (2013.01); *C21D 2211/005* (2013.01); *Y10T 428/12799* (2015.01)

(58) Field of Classification Search
None
See application file for complete search history.

(56) References Cited

U.S. PATENT DOCUMENTS

| | | |
|---|---|---|
| 2011/0030854 A1 | 2/2011 | Matsuda et al. |
| 2016/0326608 A1* | 11/2016 | Hayashi .................. C21D 9/48 |
| 2019/0161823 A1 | 5/2019 | Kohsaka et al. |

FOREIGN PATENT DOCUMENTS

| | | | | |
|---|---|---|---|---|
| EP | 3339459 A1 * | 6/2018 | ............... | C21D 6/00 |
| JP | 2008-214656 A | 9/2008 | | |
| JP | 5151390 B2 | 2/2013 | | |
| JP | 2013-100606 A | 5/2013 | | |
| JP | 5659929 B2 | 1/2015 | | |
| WO | WO 2009/096596 A1 | 8/2009 | | |
| WO | WO 2018/030503 A1 | 2/2018 | | |

* cited by examiner

*Primary Examiner* — Seth Dumbris
(74) *Attorney, Agent, or Firm* — Birch, Stewart, Kolasch & Birch, LLP

(57) ABSTRACT

A steel sheet includes a predetermined composition satisfying Expression (1), in which the microstructure at the ¼ thickness position from the surface in the sheet thickness direction includes, by vol %, ferrite: 95% or more and a remainder of the microstructure: 5% or less, has a proportion of unrecrystallized ferrite in the ferrite of 5% or less, and a half width w and an X-ray wavelength λ at a peak of (200) plane of the ferrite satisfy Expression (2).

$0.80 \leq \{(Ti/48-N/14)+Nb/93\}/(C/12) \leq 5.00$    (1)

$w \times \lambda \geq 0.20$    (2)

12 Claims, No Drawings

STEEL SHEET AND METHOD OF MANUFACTURING THE SAME

TECHNICAL FIELD OF THE INVENTION

The present invention relates to a steel sheet and a method for manufacturing the same.

Priority is claimed on Japanese Patent Application No. 2020-001529, filed on Jan. 8, 2020, the content of which is incorporated herein by reference.

BACKGROUND ART

Recently, in vehicles, in order to reduce the weight of a vehicle body for a reduction in fuel consumption, to reduce the emissions of carbon dioxide gas, or to absorb collision energy during collision for ensuring the protection and safety of passengers, high strength steel sheets are widely used. However, in general, in a case where a steel sheet is high-strengthened, deformability (for example, ductility or bendability) deteriorates.

For example, Patent Document 1 discloses a high strength steel sheet having a tensile strength of 900 MPa or higher where high strength and excellent formability can be simultaneously achieved. In Patent Document 1, a steel structure includes, by area ratio, 5% or more and 80% or less of ferrite, 15% or more of autotempered martensite, 10% or less of bainite, 5% or less of residual austenite, and 40% or less of as-quenched martensite; an average hardness of the autotempered martensite is HV≤700; and the average number of precipitated iron-based carbide grains each having a size of 5 nm or more and 0.5 µm or less in the autotempered martensite is $5 \times 10^4$ or more per 1 $mm^2$.

Patent Document 2 discloses a steel sheet having a tensile strength of 900 MPa or higher, excellent weldability, and excellent elongation. The steel sheet in Patent Document 2 includes, as a steel structure, by area ratio, 25% or more and 65% or less of ferrite, 35% or more and 75% or less of martensite having iron-based carbides precipitated in the martensite grains, and 20% or less (including 0%) in total of the remainder of the microstructure other than the ferrite and the martensite, in which an average grain size of each of the ferrite and the martensite is 5 µm or less, and a total atomic concentration of Si and Mn at an interface between the ferrite and the martensite is 5% or more.

Patent Document 3 discloses a cold-rolled steel sheet including, as a steel structure, 60 area % or more in total of ferrite and bainite and 3 area % or more and 20 area % or less of residual austenite, in which an average grain size of the ferrite and the bainite is 0.5 µm or more and 6.0 µm or less, a C concentration in the residual austenite is 0.5 mass % or more and 1.2 mass % or less, the cold-rolled steel sheet has an element concentration distribution in which an average interval in an orthogonal-to-rolling direction of each of a Mn concentrated portion and a Si concentrated portion that extend in a rolling direction at a 50 µm depth position from a steel sheet surface is 1000 µm or less, the cold-rolled steel sheet has surface properties in which a maximum depth of cracks on the steel sheet surface is 4.5 µm or less and a number density of cracks having a width of 6 µm or less and a depth of 2 µm or more is 10 pieces/50 µm or less, and the cold-rolled steel sheet has mechanical properties in which a tensile strength (TS) is 800 MPa or higher and 1200 MPa or lower, a work hardening coefficient (ns) in a plastic strain region of 3% or more and 8% or less is 0.10 or more, and bendability satisfies an expression (R/t≤1.5).

Here, for an exterior steel sheet used for a side panel or a hood of a vehicle, excellent dent resistance is required. In order to improve dent resistance, it is effective to increase the yield strength for high-strengthening. On the other hand, in order to suppress the occurrence of surface strain and to ensure surface accuracy during press forming, it is necessary to decrease yield strength. As a steel sheet that satisfies required properties contradictory to each other to achieve press formability and high-strengthening at the same time, a bake hardenable steel sheet (BH steel sheet) is disclosed.

This BH steel sheet is a steel sheet where the yield strength increases by performing a paint baking treatment including high-temperature heating and high-temperature retention after press forming. This BH steel sheet needs to have excellent bake hardenability (BH property) such that the yield strength after the paint baking treatment increases. In particular, it is required to introduce a higher strain than that in the related art into an exterior steel sheet, for example, to form a steel sheet in a complicated shape for reducing the weight of a vehicle body. To that end, steel having excellent bake hardenability even in a high strain region is required.

As a result of an investigation by the present inventors, it was found that bake hardenability (BH property) is not sufficient with the techniques disclosed in Patent Documents 1 to 3.

PRIOR ART DOCUMENT

Patent Document

[Patent Document 1] PCT International Publication No. WO2009/096596
[Patent Document 2] PCT International Publication No. WO2018/030503
[Patent Document 3] Japanese Patent No. 5659929

DISCLOSURE OF THE INVENTION

Problems to be Solved by the Invention

The present invention has been made in consideration of not only improvement of formability but also improvement of BH property in a high strain region as described above in a steel sheet. An object of the present invention is to provide a steel sheet (including a galvanized steel sheet, a zinc alloy plated steel sheet, a galvannealed steel sheet, and an alloy galvannealed steel sheet) having excellent formability and excellent BH property in a high strain region, and a method of manufacturing the same.

Means for Solving the Problem

The summary of the present invention is as follows.

[1] According to one aspect of the present invention, there is provided a steel sheet including, as a composition, by mass %:
C: 0.0003% to 0.0100%;
Si: 0.005% to 1.500%;
Mn: 0.010% to 3.000%;
Al: 0.005% to 1.000%;
P: 0.100% or less;
S: 0.0200% or less;
N: 0.0150% or less;
O: 0.0100% or less;
V: 0% to 0.50%;
Cr: 0% to 1.00%;

Ni: 0% to 1.00%;
Cu: 0% to 1.00%;
Mo: 0% to 1.00%;
W: 0% to 1.00%;
B: 0% to 0.0100%;
Sn: 0% to 1.00%;
Sb: 0% to 0.20%;
one or two or more selected from the group consisting of Ca, Ce, Mg, Zr, La, and REM: 0% to 0.0100% in total;
one or two selected from the group consisting of Ti: 0.010% to 0.100% and Nb: 0.005% to 0.060%; and
a remainder including Fe and impurities,
in which Expression (1) is satisfied,
a microstructure at a ¼ thickness position from a surface in a sheet thickness direction includes, by vol %, ferrite: 95% or more and a remainder of the microstructure: 5% or less, has a proportion of unrecrystallized ferrite in the ferrite of 5% or less, and
a half width w and an X-ray wavelength λ at a peak of (200) plane of the ferrite satisfy Expression (2), $$0.80 \leq \{(Ti/48 - N/14) + Nb/93\}/(C/12) \leq 5.00 \quad (1),$$

$$w \times \lambda \geq 0.20 \quad (2),$$

wherein each of Ti, N, Nb, and C in Expression (1) represents a content by mass % of the element, and when the element is not included, 0 is substituted as the content of the element.

[2] In the steel sheet according to (1), the composition may further include, by mass %, one or two or more selected from the group consisting of:
V: 0.01% to 0.50%;
Cr: 0.05% to 1.00%;
Ni: 0.05% to 1.00%;
Cu: 0.05% to 1.00%;
Mo: 0.03% to 1.00%;
W: 0.03% to 1.00%;
B: 0.0005% to 0.0100%;
Sn: 0.01% to 1.00%;
Sb: 0.005% to 0.20%; and
one or two or more selected from the group consisting of Ca, Ce, Mg, Zr, La, and REM: 0.0001% to 0.0100% in total.

[3] In the steel sheet according to (1) or (2), an average grain size of the ferrite in the microstructure may be 6.0 μm to 15.0 μm.

[4] The steel sheet according to any one of (1) to (3) may further include a galvanized layer on the surface.

[5] The steel sheet according to any one of (1) to (3) may include a zinc alloy plated layer on the surface.

[6] In the steel sheet according to (4) or (5), a Fe content in the galvanized layer or the zinc alloy plated layer may be 7.0% to 13.0% by mass %.

[7] According to another aspect of the present invention, there is provided a method of manufacturing the steel sheet according to any one of (1) to (3), including:
a hot-rolling process of heating a steel piece having the composition according to (1) to 1200° C. to 1320° C., completing hot rolling such that a hot rolling completion temperature is 880° C. or higher, and cooling the steel piece to obtain a hot-rolled steel sheet such that an average cooling rate in a temperature range of the hot rolling completion temperature to 500° C. is 20° C./s or faster;
a reheating process of heating the hot-rolled steel sheet to a temperature range of 500° C. to 700° C.;
a cooling process of cooling the hot-rolled steel sheet to room temperature;
a cold rolling process of cold-rolling the hot-rolled steel sheet to obtain a cold-rolled steel sheet such that a total rolling reduction is 60% to 90% and a cold rolling completion temperature is 250° C. or lower;
an annealing process of heating the cold-rolled steel sheet to an annealing temperature of 700° C. to 850° C. and cooling to a temperature range of 80° C. or lower; and
a temper rolling process of performing temper rolling on the cold-rolled steel sheet such that a total rolling reduction is 0.05% to 2.00%,
in which in the reheating process,
Expression (3) is satisfied in a temperature range of 500° C. to 700° C., and
in the annealing process,
Expression (4) is satisfied in a temperature range of 700° C. to the annealing temperature during heating to the annealing temperature, and
Expression (5) is satisfied in the temperature range of 500° C. to 700° C. during cooling from the annealing temperature, and
bending is performed while applying a tension of 20 MPa or higher in a temperature range of 80° C. to 500° C., $$t_n = 10 \frac{T_{n-1} + 273}{T_n + 273} \cdot \log_{10} t_{n-1} - \quad \text{Expression (3)}$$

$$\left(1 - \frac{T_{n-1} + 273}{T_n + 273}\right) \cdot 21 \cdot \left(1 + 2.5 \cdot \sqrt{C \cdot (Nb + 4Ti)}\right) + \Delta t_K$$

$$K_n = (T_n + 273) \cdot \left\{\log_{10} t_n + 21 \cdot \left(1 + 2.5 \cdot \sqrt{C \cdot (Nb + 4Ti)}\right)\right\}$$

$$K_{20} \geq 1.50 \times 10^4$$

in Expression (3), $K_{20}$ represents an index representing a degree of progress of precipitation of a Ti and/or Nb carbonitride in a 20th period when a temperature history in the temperature range of 500° C. to 700° C. of the reheating process is divided into 20 periods with respect to time,
$t_n$ and $K_n$ are calculated when the temperature history in the temperature range of 500° C. to 700° C. of the reheating process is divided into 20 periods with respect to time and an average temperature in an n-th period is represented by $T_n$ [° C.],
$\Delta t_K$ represents a time [hr.] in one of 20 periods into which a total residence time in the same temperature range is divided,
each of C, Nb, and Ti represents a content [mass %] of the element, and
$t_1 = \Delta t_K$, $$R_m = A \cdot \frac{\Delta t_R^{0.5}}{K_{20}} \cdot \exp\left(-\frac{B}{T_m}\right) \quad \text{Expression (4)}$$

$$1.0 \leq \sum_{i=1}^{10} R_i \leq 15.0$$

in Expression (4), $R_i$ represents an index representing a degree of progress of recrystallization in the temperature range of 700° C. to the annealing temperature and a degree of progress of diffusion of C from a Ti and/or Nb carbonitride present in a grain boundary into crystal grains,
$R_m$ is calculated when a temperature history of the steel sheet from 700° C. to the annealing temperature during heating in the annealing process is divided into 10 periods with respect to time and an average temperature in an m-th period is represented by $T_m$ [° C.], $\Delta t_R$ represents a time [s] in one of 10 periods into which a total residence time in the temperature range of 700° C. to the annealing temperature is divided, $K_{20}$ is a value obtained by Expression (3), and A and B represent constant terms, A represents $9.67 \times 10^9$ and B represents $1.25 \times 10^4$, and $$P_k = D \cdot \{E \cdot (700 - T_k)^{1.5} + (700 - T_k)\} \cdot \exp\left(-\frac{F}{T_k}\right) \cdot \Delta t_p^{0.5} \quad \text{Expression (5)}$$

$$1.0 \leq R_{10} \cdot \sum_{j=1}^{10} p_j \leq 15.0$$

in Expression (5), $P_j$ represents an index representing a degree of progress of precipitation of C in a temperature range of 700° C. to 500° C., $P_k$ is calculated when a temperature history of the steel sheet from 700° C. to 500° C. during cooling in the annealing process is divided into 10 periods with respect to time and an average temperature in a k-th period is represented by $T_k$ [° C.], $\Delta t_p$ represents a time [s] in one of 10 periods into which a total residence time in the same temperature range is divided, $R_{10}$ represents a value obtained by substituting 10 into m of $R_m$ in Expression (4), and D, E, and F represent constant terms, D represents $4.47 \times 10^4$, E represents $2.11 \times 10^0$, and F represents $1.25 \times 10^4$.

[8] In the method of manufacturing a steel sheet according to (7), during cooling in the annealing process, hot-dip galvanizing may be performed on the cold-rolled steel sheet.

[9] In the method of manufacturing a steel sheet according to (7), during cooling in the annealing process, hot-dip zinc alloy plating may be performed on the cold-rolled steel sheet.

[10] In the method of manufacturing a steel sheet according to (8) or (9), during cooling in the annealing process, alloying may be performed after the hot-dip galvanizing or the hot-dip zinc alloy plating.

Effects of the Invention

In the above-described aspects according to the present invention, a steel sheet having excellent formability and BH property and a method of manufacturing the same can be provided.

EMBODIMENTS OF THE INVENTION

Hereinafter, a steel sheet according to an embodiment and a method of manufacturing the same will be sequentially described. First, the reason for limiting a composition (chemical composition) of the steel sheet according to the embodiment will be described. A limited numerical range described below with "~" interposed therebetween includes a lower limit value and an upper limit value. A numerical value shown together with "less than" or "more than" is not included in a numerical range. All the "%" in the composition represents "mass %".

The steel sheet according to the embodiment includes, as a composition, by mass %: C: 0.0003% to 0.0100%; Si: 0.005% to 1.500%; Mn: 0.010% to 3.000%; Al: 0.005% to 1.000%; P: 0.100% or less; S: 0.0200% or less; N: 0.0150% or less; O: 0.0100% or less; V: 0% to 0.50%; Cr: 0% to 1.00%; Ni: 0% to 1.00%; Cu: 0% to 1.00%; Mo: 0% to 1.00%; W: 0% to 1.00%; B: 0% to 0.0100%; Sn: 0% to 1.00%; Sb: 0% to 0.20%; one or two or more selected from the group consisting of Ca, Ce, Mg, Zr, La, and REM: 0% to 0.0100% in total; one or two selected from the group consisting of Ti: 0.010% to 0.100% and Nb: 0.005% to 0.060%; and a remainder including Fe and impurities, in which Expression (1) $0.80 \leq \{(Ti/48 - N/14) + Nb/93\}/(C/12) \leq 5.00$ is satisfied. Hereinafter, each of the elements will be described.

C: 0.0003% to 0.0100%

C is an element that significantly increases the strength of the steel sheet. When the C content is 0.0003% or more, a sufficient tensile strength (maximum tensile strength) can be obtained. Therefore, the C content is set to be 0.0003% or more. In order to further increase the tensile strength of the steel sheet, the C content is preferably 0.0005% or more and more preferably 0.0010% or more.

In addition, when the C content is 0.0100% or less, the formation of a large amount of residual austenite after a heat treatment can be suppressed, and the BH property can be ensured. In addition, the formability of the steel sheet can be ensured. Therefore, the C content is set to be 0.0100% or less. In order to further improve the BH property, the C content is preferably 0.0090% or less and more preferably 0.0080% or less.

Si: 0.005% to 1.500%

Si is an element that refines an iron-based carbide and contributes to improvement of a balance between the strength and the formability. In order to improve the balance between the strength and the formability, the Si content is set to be 0.005% or more. The Si content is preferably 0.025% or more. In particular, from the viewpoint of increasing the strength, the Si content is more preferably 0.100% or more.

In addition, when the Si content is 1.500% or less, the formation of a coarse Si oxide that functions as a fracture origin can be suppressed, cracking is not likely to occur, and the embrittlement of the steel can be suppressed. Therefore, the Si content is set to be 1.500% or less. The Si content is preferably 1.300% or less and more preferably 1.000% or less.

Mn: 0.010% to 3.000%

Mn is an element that improves hardenability of the steel and contributes to improvement of the strength. In order to obtain a desired strength, the Mn content is set to be 0.010% or more. The Mn content is preferably 0.050% or more and more preferably 0.200% or more.

In addition, when the Mn content is 3.000% or less, the loss of macroscopic homogeneity in the steel sheet caused by segregation of Mn during casting can be suppressed, and deterioration in the formability of the steel sheet can be suppressed. When the Mn content is 3.000% or more, the $A_{c1}$ temperature of the steel decreases, and the amount of ferrite formed in the annealing process decreases. Therefore, the formability deteriorates. Therefore, the Mn content is set to be 3.000% or less. In order to obtain more satisfactory formability, the Mn content is preferably 2.800% or less and more preferably 2.600% or less.

Al: 0.005% to 1.000%

Al is an element which functions as a deoxidation material. When the Al content is 0.005% or more, a deoxidation effect can be sufficiently obtained. Therefore, the Al content is set to be 0.005% or more. The Al content is preferably 0.010% or more and more preferably 0.020% or more.

Al is also an element that forms a coarse oxide as a fracture origin and embrittles the steel. When the Al content is 1.000% or less, the formation of a coarse oxide as a fracture origin can be suppressed, and easy cracking of the cast piece can be suppressed. Therefore, the Al content is set to be 1.000% or less. The Al content is preferably 0.800% or less and more preferably 0.600% or less.

P: 0.100% or less

P is an element that embrittles the steel and embrittles a molten portion formed by spot welding. When the P content is 0.100% or less, easy cracking of the steel sheet in the formation process caused by embrittlement can be suppressed. Therefore, the P content is set to be 0.100% or less. From the viewpoint of productivity, the P content is preferably 0.050% or less and more preferably 0.030% or less.

The lower limit of the P content may be 0%. By setting the P content to be 0.001% or more, the manufacturing costs can be further suppressed. Therefore, the lower limit of the P content may be set to be 0.001%.

S: 0.0200% or less

S is an element that forms a Mn sulfide and deteriorates formability such as ductility, hole expansibility, stretch flangeability, or bendability. When the S content is 0.0200 or less, significant deterioration in the formability of the steel sheet can be suppressed. Therefore, the S content is set to be 0.0200% or less. The S content is preferably 0.0100% or less and more preferably 0.0080% or less.

The lower limit of the S content may be 0%. By setting the S content to be 0.0001% or more, the manufacturing costs can be further suppressed. Therefore, the lower limit of the S content may be set to be 0.0001%.

N: 0.0150% or less

N is an element that forms a nitride and deteriorates formability such as ductility, hole expansibility, stretch flangeability, or bendability. When the N content is 0.0150% or less, deterioration in the formability of the steel sheet can be suppressed. Therefore, the N content is set to be 0.0150% or less. In addition, N is also an element that causes weld defects during welding and hinders productivity. Therefore, the N content is preferably 0.0120% or less and more preferably 0.0100% or less.

The lower limit of the N content may be 0%. By setting the N content to be 0.0005% or more, the manufacturing costs can be further suppressed. Therefore, the lower limit of the N content may be set to be 0.0005%.

O: 0.0100% or less

O is an element that forms an oxide and hinders formability such as ductility, hole expansibility, stretch flangeability, or bendability. When the O content is 0.0100% or less, significant deterioration in the formability of the steel sheet can be suppressed. Therefore, the O content is set to be 0.0100% or less. The O content is preferably 0.0080% or less and more preferably 0.0050% or less.

The lower limit of the O content may be 0%. By setting the O content to be 0.0001% or more, the manufacturing costs can be further suppressed. Therefore, the lower limit of the O content may be set to be 0.0001%.

one or two or more selected from group consisting of M: 0.010% to 0.100% and Nb: 0.005% to 0.060%

Ti is an element having an effect of reducing the amounts of S, N, and O causing the formation of a coarse inclusion that functions as a fracture origin. In addition, Ti has an effect of refining the structure to improve a balance between the strength and the formability of the steel sheet. Nb is an element that contributes to improvement of the strength of the steel sheet by strengthening by a precipitate, grain refinement strengthening by growth suppression of ferrite crystal grains, and dislocation strengthening by suppression of recrystallization. Further, Ti and Nb form a carbonitride to immobilize carbon and nitrogen, and suppress the remaining of an excess amount of solid solution carbon in ferrite grains. In addition, by including a desired amount of M or Nb, the BH property of the steel sheet can be improved. In order to obtain these effects, one or two selected from the group consisting of Ti and Nb are included. In order to reliably obtain the above-described effect, one or two selected from the group consisting of T: 0.010% or more and Nb: 0.005% or more are included. As long as 0.010% or more of Ti or 0.005% or more of Nb is included, there are no problems even when the content of other elements as impurities is less than the lower limit thereof. Unless a predetermined amount of any one of Ti or Nb is included, the yield point increases due to an excess amount of remaining solid solution carbon, and yielding elongation may occur.

When the Ti content is 0.100% or less, the formation of a coarse Ti sulfide, a coarse Ti nitride, or a coarse Ti oxide can be suppressed, and deterioration in the formability of the steel sheet can be suppressed. In addition, the proportion of unrecrystallized ferrite can be reduced, and the formability of the steel sheet can be ensured. Therefore, the Ti content is set to be 0.100% or less. Therefore, the Ti content is preferably 0.075% or less and more preferably 0.060% or less. When the Nb content is 0.060% or less, the remaining of unrecrystallized ferrite caused by promotion of recrystallization can be suppressed, and the formability of the steel sheet can be ensured. Therefore, the Nb content is set to be 0.060% or less. The Nb content is preferably 0.050% or less and more preferably 0.040% or less.

The remainder in the composition of the steel sheet according to the embodiment may include Fe and impurities. Examples of the impurities include elements that are unavoidably incorporated from steel raw materials or scrap and/or in the steelmaking process and are allowable within a range where the properties of the steel sheet according to the embodiment are not hindered. Examples of the impurities include H, Na, Cl, Co, Zn, Ga, Ge, As, Se, Tc, Ru, Rh, Pd, Ag, Cd, In, Te, Cs, Ta, Re, Os, Ir, Pt, Au, Pb, Bi, and Po. The total content of the impurities may be 0.100% or less.

The steel sheet according to the embodiment may include elements as optional elements instead of a part of Fe. When the steel sheet does not include the following optional elements, the contents of the elements are 0%.

V: 0% to 0.50%

V is an element that contributes to improvement of the strength of the steel sheet by strengthening by a precipitate, grain refinement strengthening by growth suppression of ferrite crystal grains, and dislocation strengthening by suppression of recrystallization. V does not need to be included. Therefore, the lower limit of the V content includes 0%. In order to sufficiently obtain the strength improvement effect by V, the V content is preferably 0.01% or more and more preferably 0.03% or more.

In addition, when the V content is 0.50% or less, deterioration in the formability of the steel sheet caused by precipitation of a large amount of carbonitrides can be suppressed. Therefore, the V content is set to be 0.50% or less.

Cr: 0% to 1.00%

Cr is an element that improves hardenability of the steel and contributes to improvement of the strength of the steel sheet, and is an element that can be replaced with a part of Mn. Cr does not need to be included. Therefore, the lower limit of the Cr content includes 0%. In order to sufficiently obtain the strength improvement effect by Cr, the Cr content is preferably 0.05% or more and more preferably 0.20% or more.

In addition, when the Cr content is 1.00% or less, the formation of a coarse Cr carbide that can function as a fracture origin can be suppressed. Therefore, the Cr content is set to be 1.00% or less.

Ni: 0% to 1.00%

Ni is an element that suppresses phase transformation at a high temperature and contributes to improvement of the strength of the steel sheet, and is an element that can be replaced with a part of Mn. Ni does not need to be included. Therefore, the lower limit of the Ni content includes 0%. In order to sufficiently obtain the strength improvement effect by Ni, the Ni content is preferably 0.05% or more and more preferably 0.20% or more.

In addition, when the Ni content is 1.00% or less, deterioration in the weldability of the steel sheet can be suppressed. Therefore, the Ni content is set to be 1.00% or less.

Cu: 0% to 1.00%

Cu is an element that is present in the steel in the form of fine grains and contributes to improvement of the strength of the steel sheet, and is an element that can be replaced with a part of C and/or Mn. Cu does not need to be included. Therefore, the lower limit of the Cu content includes 0%. In order to sufficiently obtain the strength improvement effect by Cu, the Cu content is preferably 0.05% or more and more preferably 0.15% or more.

In addition, when the Cu content is 1.00% or less, deterioration in the weldability of the steel sheet can be suppressed. Therefore, the Cu content is set to be 1.00% or less.

Mo: 0% to 1.00%

Mo is an element that suppresses phase transformation at a high temperature and contributes to improvement of the strength of the steel sheet, or is an element that can be replaced with a part of Mn. Mo does not need to be included. Therefore, the lower limit of the Mo content includes 0%. In order to sufficiently obtain the strength improvement effect by Mo, the Mo content is preferably 0.03% or more and more preferably 0.06% or more.

In addition, when the Mo content is 1.00% or less, deterioration in productivity caused by deterioration in hot workability can be suppressed. Therefore, the Mo content is set to be 1.00% or less.

W: 0% to 1.00%

W is an element that suppresses phase transformation at a high temperature and contributes to improvement of the strength of the steel sheet, or is an element that can be replaced with a part of C and/or Mn. W does not need to be included. Therefore, the lower limit of the W content includes 0%. In order to sufficiently obtain the strength improvement effect by W, the W content is preferably 0.03% or more and more preferably 0.10% or more.

In addition, when the W content is 1.00% or less, deterioration in productivity caused by deterioration in hot workability can be suppressed. Therefore, the W content is set to be 1.00% or less.

B: 0% to 0.0100%

B is an element that suppresses phase transformation at a high temperature and contributes to improvement of the strength of the steel sheet, and is an element that can be replaced with a part of Mn. B does not need to be included. Therefore, the lower limit of the B content includes 0%. In order to sufficiently obtain the strength improvement effect by B, the B content is preferably 0.0005% or more and more preferably 0.0010% or more.

In addition, when the B content is 0.0100% or less, deterioration in the strength of the steel sheet caused by the formation of a B precipitate can be suppressed. Therefore, the B content is set to be 0.0100% or less.

Sn: 0% to 1.00%

Sn is an element that suppresses the coarsening of crystal grains and contributes to improvement of the strength of the steel sheet. Sn does not need to be included. Therefore, the lower limit of the Sn content includes 0%. In order to sufficiently obtain the effect by Sn, the Sn content is more preferably 0.01% or more.

In addition, when the Sn content is 1.00% or less, fracture during rolling caused by embrittlement of the steel sheet can be suppressed. Therefore, the Sn content is set to be 1.00% or less.

Sb: 0% to 0.20%

Sb is an element that suppresses the coarsening of crystal grains and contributes to improvement of the strength of the steel sheet. Sb does not need to be included. Therefore, the lower limit of the Sb content includes 0%. In order to sufficiently obtain the effect, the Sb content is preferably 0.005% or more.

In addition, when the Sb content is 0.20% or less, fracture during rolling caused by embrittlement of the steel sheet can be suppressed. Therefore, the Sb content is set to be 0.20% or less.

One or Two or More selected from Ca, Ce, Mg, Zr, La, and REM: 0% to 0.0100% in total The composition of the steel sheet according to the embodiment may optionally include one or two or more selected from Ca, Ce, Mg, Zr, La, and REM. Ca, Ce, Mg, Zr, La, and REM are elements that contribute to improvement of the formability of the steel sheet. The lower limit of the total content of one or two or more selected from Ca, Ce, Mg, Zr, La, and REM includes 0%. In order to sufficiently obtain the formability improvement effect, the total content is preferably 0.0001% or more and more preferably 0.0010% or more.

In addition, when the total content of one or two or more selected from Ca. Ce, Mg, Zr, La, and REM is 0.0100% or less, deterioration in the ductility of the steel sheet can be suppressed. Therefore, the total content of the elements is set to be 0.0100% or less. The total content is preferably 0.0050% or less.

REM (Rare Earth Metal) refers to an element group other than La and Ce that can be individually specified in the element group belonging to lanthanoids. In most cases, these elements are added in the form of mischmetal. However, the lanthanoid-based elements other than La and Ce may be inevitably included.

$$0.80 \leq \{(Ti/48-N/14)+Nb/93\}/(C/12) \leq 5.00 \quad (1)$$

The chemical composition of the steel sheet according to the embodiment satisfies Expression (1). By satisfying Expression (1), the amount of cementite in the microstructure increases such that deterioration in the formability of the steel sheet can be suppressed and deterioration in BH property can be suppressed.

Each of Ti, N, Nb, and C in Expression (1) represents a content by mass % of the element, and when the element is not included, 0 is substituted as the content of the element. When a value (Ti/48−N/14) in parentheses including Ti and N is negative, 0 is substituted as the value in the parentheses.

Next, the microstructure of the steel sheet according to the embodiment will be described.

In the steel sheet according to the embodiment, the microstructure at the ¼ thickness position from the surface in the sheet thickness direction includes, by vol %, ferrite: 95% or more and a remainder of the microstructure: 5% or less, has a proportion of unrecrystallized ferrite in the ferrite of 5% or less, and a half width w and an X-ray wavelength λ at a peak of (200) plane of the ferrite (the unit of w is degree, and the unit of λ is Å) satisfy Expression (2).

In the embodiment, the reason for limiting the microstructures at the ¼ thickness position in the sheet thickness direction from the surface is that the microstructure at the position are representative microstructures of the steel sheet and have a strong correlation with the mechanical properties of the steel sheet. All of the proportions of structures in the microstructure are volume percentages.

$$w \times \lambda \geq 0.20 \quad (2)$$

The unit of w×λ is "degree×Å".

Ferrite: 95% or more

Ferrite is a structure having excellent formability. When the volume percentage of ferrite is 95% or more, desired formability can be obtained. Therefore, the volume percentage of ferrite is set to be 95% or more. The volume percentage of ferrite is preferably 97% or more. It is preferable that the amount of ferrite is large. Therefore, the volume percentage of ferrite may be 100%.

The ferrite described herein also includes unrecrystallized ferrite.

Remainder of the Microstructure: 5% or less

In the embodiment, the remainder of the microstructure is a structure that deteriorates the formability of the steel sheet. By setting the volume percentage of the remainder of the microstructure to be 5% or less, the formability of the steel sheet can be ensured. Therefore, the volume percentage of the remainder of the microstructure is set to be 5% or less. The remainder of the microstructure does not need to be present, and thus the volume percentage of the remainder of the microstructure may be 0%. The remainder of the microstructure in the embodiment refers to acicular ferrite, massive ferrite, pearlite, bainite, martensite, and residual austenite.

Proportion of Unrecrystallized Ferrite in Ferrite: 5% or Less

The unrecrystallized ferrite is ferrite where strain introduced by cold rolling or the like remains, and has a higher strength but lower ductility than typical ferrite. Accordingly, in the steel sheet according to the embodiment, the proportion of unrecrystallized ferrite in the ferrite is limited to 5% or less. The proportion of unrecrystallized ferrite in the ferrite is set to be preferably 3% or less and more preferably 1% or less. In order to improve the formability of the steel sheet, it is still more preferable that unrecrystallized ferrite is not included. Therefore, the proportion of unrecrystallized ferrite in the ferrite may be 0%.

Hereinafter, a method of measuring the volume percentage ferrite will be described.

Test pieces having, as an observed section, a cross section parallel to a rolling direction of the steel sheet and perpendicular to a steel sheet surface are collected from the steel sheet. The observed section of each of the test pieces is polished and subsequently is etched with nital. In the observed section, in a region of t/8 to 3t/8 (t represents the sheet thickness) from the surface where the ¼ thickness position from the surface in the sheet thickness direction is the center, an area of $2.0 \times 10^9$ m$^2$ or more in total is observed using a field emission scanning electron microscope (FE-SEM) at a magnification of 1000 to 3000-fold in one or more visual fields.

Ferrite is identified based on the microstructural morphology (for example, a shape of crystal grains or a formation state of a carbide), and the area ratio (area %) thereof is measured. Specifically, a region where crystal grains have a lath shape and a region where a plurality of fine carbides having a major axis length of 1.0 μm or less that can be measured at the above-described magnification are present in crystal grains are identified as structures other than ferrite, and other regions are identified as ferrite. The obtained area ratio of ferrite is considered as the volume percentage of ferrite. As a result, the volume percentage of ferrite is obtained. The volume percentage of ferrite obtained herein also includes the volume percentage of unrecrystallized ferrite.

When a plurality of visual fields are observed, each of the areas analyzed in the visual fields is $4.0 \times 10^{-10}$ m$^2$ or more. In addition, the measurement of the area ratios is performed using a point counting method in each of the visual fields, 15 lines parallel to the rolling direction and 15 lines perpendicular to the rolling direction are drawn, and the structures are identified at 225 intersection points between the lines.

Average Grain Size of Ferrite: 6.0 μm to 15.0 μm

In the above-described microstructure, the average grain size of ferrite is preferably 6.0 μm to 15.0 μm. By setting the average grain size of ferrite to be 6.0 μm to 15.0 μm, a high tensile strength and high formability can be obtained at the same time.

Hereinafter, a method of measuring the average grain size of ferrite and the proportion of unrecrystallized ferrite in the ferrite will be described.

In each of the above-described visual fields where the volume percentage of ferrite is measured, at most 15 straight lines parallel to the rolling direction and at most 15 straight lines perpendicular to the rolling direction are drawn, the total length of the straight lines is set to be 150 μm or more, and the average grain size of ferrite is obtained using a linear analysis method.

Further, in the same observed section as that where the volume percentage of ferrite is measured, in the region of t/8 to 3t/8 (t represents the sheet thickness) from the surface, in one or more visual fields, the analysis of crystal orientation is performed on an area of $4.0 \times 10^8$ m$^2$ or more in total by electron backscatter diffraction (EBSD) using a FE-SEM. From the obtained crystal orientation map of bcc steel, a boundary having an orientation difference of 5.0 degrees or more is identified as a grain boundary, grain orientation spread (GOS) in the crystal grains is further obtained, crystal grains having a GOS of 1.0 degree or more are obtained as unrecrystallized ferrite, and the volume percentage of unrecrystallized ferrite is obtained. By dividing the obtained volume percentage of unrecrystallized ferrite by the volume percentage of ferrite, the proportion of unrecrystallized ferrite in the ferrite is obtained. For the analysis of crystal orientation, OIM Data Collection and OIM Data Analysis manufactured by TSL can be used.

In the ferrite according to the embodiment, the half width w and the X-ray wavelength λ at the peak of (200) plane (the unit of w is degree, and the unit of λ is Å) satisfy Expression (2) (w×λ≥0.20).

By the half width w and the X-ray wavelength λ at the peak of (200) plane of the ferrite satisfying Expression (2), desired formability and BH property can be obtained. The value of the above-described half width w increases when a crystal lattice is distorted by the presence of solid solution C in the vicinity of a grain boundary. On the other hand, when a coarse carbide is present in a grain boundary, a crystal lattice is not distorted. Therefore, the half width w does not increase. In the steel sheet according to the embodiment, a large amount of solid solution C is present in the vicinity of a grain boundary. Therefore, the half width w is large. As a result, desired formability and BH property can be obtained.

Hereinafter, a method of measuring the half width w at the peak of (200) plane of the ferrite will be described.

A small piece having a size of 25 mm×25 mm×sheet thickness is cut from the steel sheet, and a sheet surface of the test piece is mechanically polished up to a position of t/4 (t represents the sheet thickness) from the surface. Next, a strain part of the surface layer is removed by electrolytic polishing to obtain a mirror surface, and an X-ray diffraction test using a Cu bulb is performed on this observed section to obtain an X-ray diffraction pattern. From the same pattern, the peak of (200) plane of bcc steel (ferrite) is read, and the half width w and the wavelength λ at the peak are obtained to calculate Expression (2).

The steel sheet according to the embodiment may be a steel sheet including a galvanized layer or a zinc alloy plated layer on a single surface or both surfaces of the steel sheet. In addition, the steel sheet according to the embodiment may be a steel sheet including a galvannealed layer or an alloy galvannealed layer obtained by alloying a galvanized layer or a zinc alloy plated layer.

The plated layer formed on a single surface or both surfaces of the steel sheet according to the embodiment is preferably a galvanized layer or a zinc alloy plated layer including zinc as a main component. It is preferable that the zinc alloy plated layer includes Ni as an alloy component.

The galvanized layer and the zinc alloy plated layer are formed using a hot-dip plating method, an electroplating method, or a deposition plating method. When the Al content in the galvanized layer is 0.5 mass % or less, adhesion between the steel sheet surface and the galvanized layer can be ensured. Therefore, the Al content in the galvanized layer is preferably 0.5 mass % or less. When the galvanized layer is a hot-dip galvanized layer, in order to improve adhesion between the steel sheet surface and the galvanized layer, the Fe content in the hot-dip galvanized layer is preferably 3.0 mass % or less.

When the galvanized layer is an electrogalvanized layer, the Fe content in the plated layer is preferably 0.5 mass % or less from the viewpoint of improving corrosion resistance.

The galvanized layer and the zinc alloy plated layer may include one or two or more selected from the group consisting of Al, Ag, B, Be, Bi, Ca, Cd, Co, Cr, Cs, Cu, Ge, Hf, Zr, I, K, La, Li, Mg, Mn, Mo, Na, Nb, Ni, Pb, Rb, Sb, Si, Sn, Sr. Ta. Ti, V, W, Zr, and REM within a range where the corrosion resistance or formability of the steel sheet does not deteriorates. In particular, Ni, Al, and Mg are effective for improving corrosion resistance.

The galvanized layer or the zinc alloy plated layer on the surface of the steel sheet according to the embodiment may be a galvannealed layer or an alloy galvannealed layer obtained by alloying a galvanized layer or a zinc alloy plated layer. When the hot-dip galvanized layer or the hot-dip zinc alloy plated layer is alloyed, from the viewpoint of improving adhesion between the steel sheet surface and the alloy plated layer, the Fe content in the alloyed hot-dip galvanized layer (galvannealed layer) or the alloyed hot-dip zinc alloy plated layer (alloy galvannealed layer) is preferably 7.0 mass % to 13.0 mass %. By alloying the steel sheet including the hot-dip galvanized layer or the hot-dip zinc alloy plated layer, Fe is incorporated into the plated layer such that the Fe content increases. As a result, the Fe content can be made to be 7.0 mass % or more. That is, the galvanized layer having a Fe content of 7.0 mass % or more is a galvannealed layer or an alloy galvannealed layer.

The Fe content in the alloyed hot-dip galvanized layer (galvannealed layer) or the alloyed hot-dip zinc alloy plated layer (alloy galvannealed layer) can be obtained using method. Only the plated layer is removed by dissolving with a 5 vol % HCl aqueous solution to which an inhibitor is added. By measuring the Fe content in the obtained solution by inductively coupled plasma-atomic emission spectrometry (ICP-AES), the Fe content (mass %) in the galvanized layer is obtained.

The sheet thickness of the steel sheet according to the embodiment is not limited to a specific range but, in consideration of versatility or manufacturability is preferably 0.2 mm to 5.0 mm. By setting the sheet thickness to be 0.2 mm or more, the shape of the steel sheet can be easily maintained to be flat, and the dimensional accuracy and the shape accuracy can be improved. Therefore, the sheet thickness is preferably 0.2 mm or more. The sheet thickness is more preferably 0.4 mm or more.

In addition, by setting the sheet thickness to be 5.0 mm or less, appropriate strain application and temperature control can be easily performed in the process of manufacturing, a homogeneous structure can be obtained. Therefore, the sheet thickness is preferably 5.0 mm or less. The sheet thickness is more preferably 4.5 mm or less.

In the steel sheet according to the embodiment, the tensile strength is preferably 270 MPa or higher. The tensile strength is more preferably 300 MPa or higher. The upper limit is not particularly limited and may be, for example, 500 MPa or lower.

The tensile strength is measured by preparing a 5 test piece according to JIS Z 2241:2011 and setting the direction (C direction) perpendicular to the rolling direction of the steel sheet as a tension axis to perform the tensile test.

Next, a method of manufacturing the steel sheet according to the embodiment will be described.

As long as the steel sheet according to the embodiment has the above-described characteristics, the effects thereof can be obtained irrespective of the manufacturing method thereof. A manufacturing method including processes is preferable because the steel sheet according to the embodiment can be stably manufactured. In the following manufacturing method, by controlling the processes in a complex and indivisible way, a steel sheet having desired characteristics can be manufactured.

(I) a hot-rolling process of heating a steel piece having a predetermined composition to 1200° C. to 1320° C., completing hot rolling such that a hot rolling completion temperature is 880° C. or higher, and cooling the steel piece to obtain a hot-rolled steel sheet such that an average cooling rate in a temperature range of the hot rolling completion temperature to 500° C. is 20° C./s or faster;

(II) a reheating process of heating the hot-rolled steel sheet to a temperature range of 500° C. to 700° C.;

(III) a cooling process of cooling the hot-rolled steel sheet to room temperature;

(IV) a cold rolling process of cold-rolling the hot-rolled steel sheet to obtain a cold-rolled steel sheet such that a total rolling reduction is 60% to 90% and a cold rolling completion temperature is 250° C. or lower;

(V) an annealing process of heating the cold-rolled steel sheet to an annealing temperature of 700° C. to 850° C. and cooling to a temperature range of 80° C. or lower; and (VI) a temper rolling process of performing temper rolling on the cold-rolled steel sheet such that a total rolling reduction is 0.05% to 2.00%.

Hereinafter, preferable conditions in each of the processes will be described.

<Hot Rolling Process>

First, the cast piece having the composition of the above-described steel sheet according to the embodiment is heated to 1200° C. to 1320° C. When the heating temperature is 1200° C. or higher, a carbide can be sufficiently dissolved. Further, by appropriately controlling conditions of an intermediate process described below, the unintentional formation of a coarse carbide in the intermediate process can be suppressed. As a result, the half width w and the X-ray wavelength λ can be set to be in the desired ranges.

In addition, when the heating temperature of the steel piece is 1320° C. or lower, the grain size can be reduced, and the anisotropy in the metallographic structure can be suppressed. From the viewpoint of manufacturing costs, it is preferable that the cast piece to be heated is produced by continuous casting. However, the steel piece may be produced using another casting method (for example, an ingot-making method).

After heating the steel piece, hot rolling is performed such that a hot rolling completion temperature is 880° C. or higher. When the hot rolling completion temperature is 880° C. or higher, rolling is performed in a single phase range. Therefore, anisotropy of the microstructure can be suppressed. In addition, the proportion of unrecrystallized ferrite can be reduced. Therefore, the hot rolling completion temperature is set to be 880° C. or higher. The hot rolling completion temperature may be set to be 1050° C. or lower.

After completion of hot rolling, the steel piece is cooled such that an average cooling rate in a temperature range of the hot rolling completion temperature to 500° C. is 20° C./s or faster. As a result, a hot-rolled steel sheet is obtained.

When the average cooling rate in the temperature range of the hot rolling completion temperature to 500° C. is 20° C./s or faster, the formation of a coarse Ti and/or Nb carbonitride can be suppressed, and a desired microstructure in the finally obtained steel sheet can be obtained.

The upper limit of the average cooling rate is not particularly limited. Since a special cooling medium is required to obtain a cooling rate exceeding 200° C./s, the average cooling rate is preferably 200° C./s or slower from the viewpoint of production costs. When the steel piece is cooled such that an average cooling rate in a temperature range of the hot rolling completion temperature to 500° C. is 20° C./s or faster, the temperature at which cooling stops is not particularly limited.

In the embodiment, the average cooling rate refers to a value obtained by dividing a temperature difference between a starting point and an end point in a range to be set by an elapsed time from the starting point and the end point.

<Reheating Process>

Next, the obtained hot-rolled steel sheet is heated to a temperature range of 500° C. to 700° C. When the maximum reheating temperature in the reheating process (the maximum temperature of the heating temperature in the reheating process) is 500° C. to 700° C., a desired microstructure can be obtained, and formability and BH property can be ensured.

In addition, in the reheating process, a temperature history in the temperature range of 500° C. to 700° C. needs to satisfy Expression (3). In Expression (3), $K_{20}$ represents an index representing a degree of progress of precipitation of a TI and/or Nb carbonitride in a 20th period when a temperature history in the temperature range of 500° C. to 700° C. of the reheating process is divided into 20 periods with respect to time. By the temperature history in the temperature range of 500° C. to 700° C. satisfying the following Expression (3), a fine Ti and/or Nb carbonitride can be uniformly precipitated in the steel. As a result, a desired microstructure can be obtained, and BH property can be ensured.

$$t_n = 10 \frac{T_{n-1}+273}{T_n+273} \cdot \log_{10} t_{n-1} -$$

$$\left(1 - \frac{T_{n-1}+273}{T_n+273}\right) \cdot 21 \cdot \left(1 + 2.5 \cdot \sqrt{C \cdot (Nb+4Ti)}\right) + \Delta t_K$$

$$K_n = (T_n+273) \cdot \left\{\log_{10} t_n + 21 \cdot \left(1 + 2.5 \cdot \sqrt{C \cdot (Nb+4Ti)}\right)\right\}$$

$$K_{20} \geq 1.50 \times 10^4$$

Expression (3)

In Expression (3), $t_n$ and $K_n$ are calculated when the temperature history in the temperature range of 500° C. to 700° C. of the reheating process is divided into 20 periods with respect to time and an average temperature in an n-th period is represented by $T_n$ [° C.]. $\Delta t_K$ represents a time [hr.] in one of 20 periods into which a total residence time in the same temperature range is divided, and each of C, Nb, and Ti represents a content [mass %] of the element. Here, $t_1 = \Delta t_K$. log 10 is a common logarithm with a base of 10.

<Cooling Process>

After the reheating process, the hot-rolled steel sheet is cooled to room temperature. At this time, the cooling rate is not particularly limited, and examples of a cooling method include air cooling. For example, the room temperature is 25° C., and the average cooling rate during air cooling is 10° C./s or slower.

<Cold Rolling Process>

Next, the cooled hot-rolled steel sheet is cold-rolled such that a total rolling reduction is 60% to 90% and a cold rolling completion temperature is 250° C. or lower. As a result, a cold-rolled steel sheet is obtained. When the total rolling reduction during cold rolling is 60% or more, recrystallization in the subsequent heat treatment can be made to progress sufficiently, the remaining of unrecrystallized ferrite can be suppressed, and a desired microstructure can be obtained. Therefore, the total rolling reduction during cold rolling is set to be 60% or more. From the viewpoint of refining the structures to improve a balance between the strength and the formability, the total rolling reduction is preferably 65% or more and more preferably 70% or more. In addition, when the total rolling reduction in cold rolling is 90% or less, an increase in the anisotropy of the steel sheet can be suppressed. In addition, the proportion of unrecrystallized ferrite can be reduced, and the formability can be ensured. Therefore, the total rolling reduction during cold rolling is set to be 90% or less. In order to further improve the formability, the total rolling reduction is preferably 85% or less.

During cold rolling, the temperature of the steel sheet increases due to deformation heating. When the temperature of the steel sheet is excessively high, accumulation of work strain does not progress sufficiently, the progress of recrystallization is inhibited, and an excess amount of unrecrystallized ferrite remains in the finally obtained steel sheet. Therefore, the rolling reduction and the interpass time are controlled such that the temperature of the steel sheet at the time of completion of cold rolling (cold rolling completion temperature) is 250° C. or lower. From the viewpoint of formability, in order to make recrystallization to efficiently progress, the cold rolling completion temperature is preferably 200° C. or lower. The cold rolling completion temperature may be set to be 50° C. or higher. The reason for this is that the cracking of the steel sheet can during rolling be suppressed.

<Annealing Process>

[Heating]

Next, a heat treatment (annealing) is performed on the cold-rolled steel sheet. First, the cold-rolled steel sheet is heated to an annealing temperature of 700° to 850° C. During this heating, a temperature history in a temperature range of 700° C. to the annealing temperature (700° C. to 850° C.) needs to satisfy Expression (4). In Expression (4), $R_i$ represents an index representing a degree of progress of recrystallization in the temperature range of 700° C. to the annealing temperature and a degree of progress of diffusion of C from a Ti and/or Nb carbonitride present in a grain boundary into crystal grains. By performing heating such that the temperature history in the temperature range of 700° C. to the annealing temperature satisfies Expression (4), recrystallization of ferrite is promoted, and C is diffused from a Ti and/or Nb carbonitride present in a grain boundary into crystal grains. At this time, the progress of diffusion of C from a carbide present in crystal grains is faster than the progress of diffusion of C from a carbide present in a grain boundary. Therefore, the size a Ti and/or Nb carbonitride present in a grain boundary decreases. As a result, a desired microstructure can be obtained, and formability and BH property can be ensured.

$$R_m = A \cdot \frac{\Delta t_R^{0.5}}{K_{20}} \cdot \exp\left(-\frac{B}{T_m}\right) \quad \text{Expression (4)}$$

$$1.0 \le \sum_{i=1}^{10} R_i \le 15.0$$

In Expression (4), $R_m$ is calculated when a temperature history of the steel sheet from 700° C. to the annealing temperature during heating in the annealing process is divided into 10 periods with respect to time and an average temperature in an m-th period is represented by $T_m$ [° C.]. $\Delta t_R$ represents a time [s] in one of 10 periods into which a total residence time in the same temperature range (700° C. to the annealing temperature) is divided, and $K_{20}$ is a value obtained by the value of Expression (3). In addition, A and B represent constant terms, A represents 9.67×10⁹, and B represents 1.25×10⁴.

The annealing temperature in the annealing process is set to be 700° C. or higher. When the annealing temperature is 700° C. or higher, a carbide can be sufficiently dissolved, and a desired microstructure can be obtained. The annealing temperature is preferably 750° C. or higher and more preferably 780° C. or higher. In addition, when the annealing temperature is 850° C. or lower, the excessive dissolution of a carbide and the promotion of precipitation during subsequent cooling can be suppressed, and sufficient BH property can be ensured. Accordingly, the annealing temperature is set to be 850° C. or lower. In order to increase the volume percentage of ferrite to further improve formability, the annealing temperature is preferably 830° C. or lower and more preferably 810° C. or lower.

[Retention]

The retention time at the annealing temperature, that is, the time required until the annealing temperature reaches 700° C. again from the range of 700° C. or higher through the retention in the range of 700° C. to 850° C. during heating is preferably 3 seconds or longer. By setting the retention time to be 3 seconds or longer, a carbide can be sufficiently dissolved, and the formability can be secured. The retention time is preferably 10 seconds or longer and more preferably 25 seconds or longer. The upper limit of the retention time is not particularly limited, but even when the retention time exceeds 200 seconds, there is little influence on the BH property of the steel sheet. Therefore, the upper limit of the retention time is preferably 200 seconds or shorter from the viewpoint of production costs.

[Cooling]

After being heated to the annealing temperature and held at the temperature for the retention time, the steel sheet is cooled.

During cooling, the temperature history in the temperature range of 500° C. to 700° C. satisfies Expression (5), and bending is performed while applying a tension of 20 MPa or higher in a temperature range of 80° C. to 500° C.

By performing cooling such that the temperature history in the temperature range of 500° C. to 700° C. satisfies Expression (5), a part of C diffused in crystal grains during heating returns to a Ti and/or Nb carbonitride of a grain boundary, and the remaining C in a solid solution state moves to the grain boundary. As a result, a desired microstructure can be obtained, and formability and BH property can be ensured. In Expression (5). $P_j$ represents an index representing a degree of progress of precipitation of C in a temperature range of 700° C. to 500° C.

$$P_k = D \cdot \{E \cdot (700 - T_k)^{1.5} + (700 - T_k)\} \cdot \exp\left(-\frac{F}{T_k}\right) \cdot \Delta t_p^{0.5} \quad \text{Expression (5)}$$

$$1.0 \le R_{10} \cdot \sum_{j=1}^{10} p_j \le 15.0$$

In Expression (5), $P_k$ is calculated when a temperature history of the steel sheet from 700° C. to 500° C. during cooling in the annealing process is divided into 10 periods with respect to time and an average temperature in a k-th period is represented by Tt [° C.]. $\Delta t_p$ represents a time [s] in one of 10 periods into which a total residence time in the same temperature range is divided. $R_{10}$ represents a value obtained by substituting 10 into m of $R_m$ in Expression (4). In addition, D, E, and F represent constant terms, D represents 4.47×10⁴, E represents 2.11×10⁰, and F represents 1.25×10⁴.

During cooling in the annealing process, after performing cooling such that the temperature history in the temperature range of 500° C. to 700° C. satisfies Expression (5), a Ti and/or Nb carbonitride and solid solution C are present in a grain boundary. When solid solution C is present in a grain boundary, dislocation present in the grain boundary is immobilized by the solid solution C, and thus the yield strength of the steel sheet increases, which is not preferable. Therefore, by performing bending while applying a tension of 20 MPa or higher in the temperature range of 80° C. to 500° C., the solid solution C present in the grain boundary is moved to the vicinity of the grain boundary together with the dislocation. In this state, the moved dislocation is immobilized by the solid solution C, and thus the yield strength is high. For bending, for example, a method of performing roll bending using metal rolls having a diameter of 100 mm to 800 mm is considered.

<Temper Rolling Process>

Temper rolling is performed on the cold-rolled steel sheet after bending such that the total rolling reduction is 0.05% to 2.00%. By performing temper rolling, the dislocation is moved from the dislocation and the solid solution C moved to the vicinity of the grain boundary by bending. As a result, the solid solution C can be taken out from the dislocation while making the solid solution C to be present in the vicinity of the grain boundary. Therefore, a desired microstructure can be obtained, and thus desired BH property and yield strength can be obtained. When the total rolling reduction of temper rolling is 0.05% or more, the dislocation can be moved from C, and sufficient BH property can be ensured. In addition, when the total rolling reduction of temper rolling is 2.00% or less, an excessive increase in yield strength can be suppressed.

In the embodiment, while or after performing bending in the temperature range of 80° C. to 500° C., hot-dip galvanizing or hot-dip zinc alloy plating may be performed on the steel sheet. At this time, the steel sheet may be reheated before being dipped in a plating bath. In addition, the plated steel sheet may be heated to alloy the plated layer.

By performing electroplating on the steel sheet after the annealing process or performing deposition plating on the steel sheet before temper rolling to form a galvanized layer on a single surface or both surfaces of the steel sheet, a galvanized steel sheet including the galvanized layer may be manufactured.

The atmosphere in the annealing process may be controlled to reform the surface of the steel sheet. For example, by performing heating in a decarburization atmosphere, a steel sheet having excellent bendability where a surface layer area of the steel sheet is appropriately decarburized is obtained.

EXAMPLES

Next, examples of the present invention will be described, but conditions of the examples are merely exemplary to confirm the operability and the effects of the present invention. The present invention is not limited to these condition examples. The present invention can adopt various conditions within a range not departing from the scope of the present invention as long as the object of the present invention can be achieved under the conditions.

Molten steels having chemical compositions shown in Tables 1-1 and 1-2 were cast to manufacture cast pieces. Next, the cast pieces were hot-rolled under conditions shown in Tables 2-1 and 2-2. First, the cast pieces were heated to steel piece heating temperatures shown in Tables 2-1 and 2-2, were hot-rolled in temperature ranges to rolling completion temperatures shown in Tables 2-1 and 2-2, and were cooled from the rolling completion temperatures to 500° C. at average cooling rates shown in Tables 2-1 and 2-2. As a result, hot-rolled steel sheets were obtained. Next, the hot-rolled steel sheets were reheated under conditions shown in Tables 2-1 and 2-2. $K_{20}$ obtained from the temperature history in the temperature range of 500° C. to 700° C. in the reheating process is shown in Tables 2-1 and 2-2. $K_{20}$ can be obtained by Expression (3). After reheating, the hot-rolled steel sheets were cooled to room temperature (25° C.) at an average cooling rate of 10° C./s or slower.

Next, the hot-rolled steel sheets were cold-rolled from the sheet thicknesses before rolling to the sheet thicknesses shown in Tables 3-1 and 3-2 after rolling such that the rolling completion temperatures were shown in Tables 3-1 and 3-2. As a result, cold-rolled steel sheets were obtained. The obtained cold-rolled steel sheets were annealed under conditions shown in Tables 3-1 and 3-2. For annealing, the steel sheets were heated to annealing temperatures shown in Tables 3-1 and 3-2, were retained at the temperatures for 3 seconds to 200 seconds (the time required until the annealing temperature reached 700° C. again from the range of 700° C. or higher through the retention in the range of 700° C. to 850° C. during heating was 3 seconds to 200 seconds), and subsequently were cooled. During cooling to a temperature range of 80° C. or lower, bending was performed while applying tensions shown in Tables 3-1 and 3-2. Next, by performing temper rolling at total rolling reductions shown in Tables 3-1 and 3-2, steel sheets were obtained.

For bending during cooling in the annealing process, roll bending was performed using metal rolls having a diameter of 100 mm in Experiment Examples 4 to 19, roll bending was performed using metal rolls having a diameter of 800 mm in Experiment Examples 39 to 54, and roll bending was performed using metal rolls having a diameter of 500 mm in other experiment examples. While or after performing bending in the temperature range of 80° C. to 500° C. during cooling in the annealing process, hot-dip galvanizing or hot-dip zinc alloy plating may be performed on some of the steel sheets. The steel sheets on which hot-dip galvanizing or hot-dip zinc alloy plating was performed were optionally alloyed. In addition, electroplating or deposition plating was performed on some of the steel sheets after the annealing process.

The plating process in Tables 3-1 and 3-2 is as follows.

Zn alloy plating: a process of cooling the steel sheet to a temperature range of 500° C. or lower in the annealing process, dipping the steel sheet in a molten zinc alloy bath, and cooling the steel sheet to room temperature to obtain a zinc alloy plated steel sheet.

Alloy Galvannealing: a process of cooling the steel sheet to a temperature range of 500° C. or lower in the annealing process, dipping the steel sheet in a molten zinc alloy bath and reheating the steel sheet to 580° C. for alloying and cooling the steel sheet to room temperature to obtain an alloy galvannealed steel sheet.

GA: a process of cooling the steel sheet to a temperature range of 500° C. or lower in the annealing process, dipping the steel sheet in a molten zinc bath and reheating the steel sheet to 560° C. for alloying and cooling the steel sheet to room temperature to obtain a hot-dip galvannealed steel sheet (GA).

GI: a process of cooling the steel sheet to a temperature range of 500° C. or lower in the annealing process, dipping the steel sheet in a molten zinc bath, and cooling the steel sheet to room temperature to obtain a hot-dip galvanized steel sheet (GI).

Deposition: a process of performing deposition plating after temper rolling to obtain a galvanized steel sheet.

EG: a process of performing electrogalvanizing after the annealing process to obtain an electrogalvanized steel sheet (EG).

Tables 3-1 and 3-2 show $\Sigma R_i$ obtained from the temperature history in the temperature range of 700° C. to the annealing temperature during heating to the annealing temperature. $\Sigma R_i$ can be obtained by Expression (4). In addition, Tables 3-1 and 3-2 show $R_{10} \cdot \Sigma P_j$ obtained from the temperature history in the temperature range of 500° C. to 700° C. during cooling from the annealing temperature. $R_{10} \cdot \Sigma P_j$ can be obtained by Expression (5).

Tables 4-1 and 4-2 show the properties of the steel sheets obtained under the manufacturing conditions shown in Tables 1-1 to 3-2. As the results of the structure observation performed using the above-described method, Tables 4-1 and 4-2 show the volume percentage of ferrite, the proportion of unrecrystallized ferrite in ferrite, and the average grain size of ferrite. In addition, Tables 4-1 and 4-2 show w×λ (the unit is "degree×Å") obtained as a result of a X-ray diffraction test using the above-described method. The proportion of unrecrystallized ferrite in ferrite was measured OIM Data Collection and OIM Data Analysis manufactured by TSL. The sheet thickness of the steel sheet was the same as the sheet thickness after rolling shown in Tables 3-1 and 3-2.

Regarding the alloyed steel sheet, the Fe content in the alloyed hot-dip galvanized layer (galvannealed layer) or the alloyed hot-dip zinc alloy plated layer (alloy galvannealed layer) was measured using the above-described method.

The plated layers in Tables 4-1 and 4-2 are as follows.
Zn alloy plated: zinc alloy plated layer
Alloy Galvannealed: alloy galvannealed layer
GA: hot-dip galvannealed layer formed by dipping the steel sheet in a molten zinc bath and alloying the steel sheet
GI: hot-dip galvanized layer formed by dipping the steel sheet in a molten zinc bath
Deposited: galvanized layer formed by deposition plating
EG: galvanized layer formed by electrogalvanizing Tables 4-1 and 4-2 show the properties of the steel sheets obtained under the manufacturing conditions of Tables 1-1 to 3-2. The yield strength and the maximum tensile strength were obtained by performing a tensile test. A 5 test piece was prepared according to JIS Z 2241:2011, and the rolling direction of the steel sheet is set as a tension axis to perform the tensile test. Regarding a steel sheet where the obtained yield strength (YS) was 180 MPa or lower and the yield ratio (YR) obtained by dividing the yield strength by the maximum tensile strength was 0.50 or less, this steel sheet was determined to have excellent formability and as "Pass". A steel sheet where the yield strength was higher than 180 MPa or the yield ratio was more than 0.50 was determined to have poor formability and as "Fail".

Further, a test piece was collected using the same method as that of the above-described tensile test, and a tensile plastic strain of 10% was applied to the test piece. After the tensile plastic strain of 10% was applied and unloaded, a baking treatment of dipping the test piece in a salt bath heated to 170° C. for 20 minutes and cooling the test piece to room temperature was performed. Next, the test piece was provided for the tensile test to obtain the yield strength. A difference ($\Delta BH$=the yield strength after the baking treatment−the maximum stress when the 10% tensile plastic strain was applied) between the obtained yield strength and the maximum stress obtained when the 10% tensile plastic strain was applied was calculated. A steel sheet where $\Delta BH$ was 20 MPa or higher was determined to have excellent bake hardenability (BH property) and as "Pass". On the other hand, a steel sheet where $\Delta BH$ was lower than 20 MPa was determined to have poor BH property and as "Fail".

TABLE 1-1

| Steel | Composition, mass %, Remainder including Fe and Impurities | | | | | | | | | | | | Middle Side of Expression (1) | Note |
|---|---|---|---|---|---|---|---|---|---|---|---|---|---|---|
| | C | Si | Mn | Al | P | S | Ti | Nb | N | O | B | Others | | |
| A | 0.0010 | 0.043 | 0.083 | 0.024 | 0.008 | 0.0083 | 0.022 | | 0.0041 | 0.0009 | | | 1.99 | Example |
| B | 0.0004 | 0.112 | 0.073 | 0.065 | 0.021 | 0.0042 | | 0.013 | 0.0026 | 0.0013 | | | 4.19 | Example |
| C | 0.0023 | 0.088 | 1.024 | 0.115 | 0.012 | 0.0081 | 0.017 | 0.015 | 0.0035 | 0.0010 | | V: 0.20 | 1.38 | Example |
| D | 0.0084 | 0.009 | 1.490 | 0.050 | 0.033 | 0.0081 | 0.072 | 0.023 | 0.0021 | 0.0019 | 0.0008 | Mo: 0.08 | 2.28 | Example |
| E | 0.0012 | 0.892 | 0.420 | 0.015 | 0.016 | 0.0017 | 0.008 | 0.032 | 0.0032 | 0.0015 | | Ni: 0.42 | 3.44 | Example |
| F | 0.0045 | 0.076 | 0.982 | 0.679 | 0.013 | 0.0026 | 0.091 | | 0.0089 | 0.0006 | 0.0010 | | 3.36 | Example |
| G | 0.0024 | 0.005 | 2.581 | 0.330 | 0.022 | 0.0007 | | 0.026 | 0.0050 | 0.0014 | 0.0015 | | 1.40 | Example |
| H | 0.0092 | 0.027 | 0.946 | 0.093 | 0.039 | 0.0090 | 0.056 | | 0.0058 | 0.0021 | | | 0.98 | Example |
| I | 0.0050 | 0.008 | 0.814 | 0.046 | 0.094 | 0.0026 | 0.026 | 0.012 | 0.0039 | 0.0008 | 0.0024 | | 0.94 | Example |
| J | 0.0026 | 0.750 | 1.387 | 0.020 | 0.012 | 0.0055 | 0.008 | 0.023 | 0.0008 | 0.0008 | | Ca: 0.0016 | 1.65 | Example |
| K | 0.0060 | 0.013 | 0.173 | 0.059 | 0.047 | 0.0020 | 0.016 | 0.041 | 0.0082 | 0.0012 | | Sb: 0.07 | 0.88 | Example |
| L | 0.0031 | 1.260 | 0.832 | 0.009 | 0.042 | 0.0051 | | 0.026 | 0.0015 | 0.0016 | | W: 0.26 | 1.08 | Example |
| M | 0.0006 | 0.198 | 0.271 | 0.095 | 0.068 | 0.0080 | 0.012 | 0.005 | 0.0029 | 0.0007 | 0.0021 | Mg: 0.0029 | 1.93 | Example |
| N | 0.0009 | 0.318 | 0.015 | 0.007 | 0.019 | 0.0056 | 0.028 | | 0.0063 | 0.0016 | | Cr: 0.63 | 1.78 | Example |
| O | 0.0045 | 0.099 | 0.123 | 0.025 | 0.007 | 0.0158 | 0.066 | 0.011 | 0.0059 | 0.0026 | | Mo: 0.36 | 2.86 | Example |
| P | 0.0020 | 0.225 | 0.889 | 0.107 | 0.023 | 0.0017 | 0.006 | 0.053 | 0.0049 | 0.0014 | | | 3.42 | Example |
| Q | 0.0027 | 0.012 | 2.194 | 0.903 | 0.010 | 0.0021 | 0.009 | 0.031 | 0.0036 | 0.0012 | 0.0006 | | 1.48 | Example |

TABLE 1-2

| Steel | Composition, mass %, Remainder including Fe and Impurities | | | | | | | | | | | | Middle Side of Expression (1) | Note |
|---|---|---|---|---|---|---|---|---|---|---|---|---|---|---|
| | C | Si | Mn | Al | P | S | Ti | Nb | N | O | B | Others | | |
| R | 0.0038 | 0.527 | 0.058 | 0.072 | 0.004 | 0.0058 | 0.053 | 0.014 | 0.0131 | 0.0014 | | | 1.01 | Example |
| S | 0.0018 | 0.062 | 0.869 | 0.051 | 0.019 | 0.0072 | 0.020 | | 0.0012 | 0.0028 | | | 2.21 | Example |
| T | 0.0069 | 0.069 | 0.362 | 0.015 | 0.034 | 0.0069 | 0.024 | 0.018 | 0.0030 | 0.0019 | | Cu: 0.35 | 0.83 | Example |
| U | 0.0017 | 0.437 | 0.098 | 0.086 | 0.012 | 0.0058 | 0.042 | 0.007 | 0.0043 | 0.0012 | 0.0013 | | 4.54 | Example |
| V | 0.0015 | 0.084 | 0.218 | 0.138 | 0.014 | 0.0105 | 0.015 | 0.013 | 0.0115 | 0.0010 | 0.0043 | | 1.12 | Example |
| W | 0.0013 | 0.284 | 0.950 | 0.219 | 0.040 | 0.0027 | | 0.023 | 0.0061 | 0.0018 | | Cu: 0.13, Sn: 0.12 | 2.28 | Example |
| X | 0.0010 | 0.013 | 0.089 | 0.034 | 0.033 | 0.0022 | 0.011 | 0.008 | 0.0040 | 0.0009 | | | 1.03 | Example |
| Y | 0.0016 | 0.051 | 0.478 | 0.014 | 0.012 | 0.0036 | 0.031 | | 0.0052 | 0.0010 | | Cr: 0.15, Ce: 0.0014 | 2.06 | Example |

TABLE 1-2-continued

| | Composition, mass %, Remainder including Fe and Impurities | | | | | | | | | | | | Middle Side of Expression | |
|---|---|---|---|---|---|---|---|---|---|---|---|---|---|---|
| Steel | C | Si | Mn | Al | P | S | Ti | Nb | N | O | B | Others | (1) | Note |
| Z | 0.0023 | 0.329 | 1.851 | 0.175 | 0.009 | 0.0057 | 0.008 | 0.018 | 0.0028 | 0.0014 | | Ni: 0.07, REM: 0.0017 | 1.01 | Example |
| AA | 0.0189 | 0.297 | 0.684 | 0.028 | 0.009 | 0.0024 | 0.062 | 0.028 | 0.0017 | 0.0014 | | | 0.93 | Comparative Example |
| AB | 0.0014 | 0.340 | 0.568 | 0.074 | 0.015 | 0.0057 | 0.017 | | 0.0042 | 0.0012 | | | 0.46 | Comparative Example |
| AC | 0.0021 | 0.570 | 0.390 | 0.024 | 0.011 | 0.0045 | 0.050 | 0.014 | 0.0024 | 0.0009 | | | 5.83 | Comparative Example |
| AD | 0.0054 | 0.259 | 0.731 | 0.024 | 0.021 | 0.0033 | 0.122 | | 0.0086 | 0.0013 | | | 4.28 | Comparative Example |
| AE | 0.0038 | 0.430 | 0.382 | 0.035 | 0.023 | 0.0045 | | 0.085 | 0.0057 | 0.0018 | | | 2.89 | Comparative Example |
| AF | 0.0030 | 1.829 | 0.540 | 0.053 | 0.021 | 0.0031 | 0.034 | 0.008 | 0.0059 | 0.0008 | | | 1.49 | Comparative Example |
| AG | 0.0024 | 0.157 | 4.156 | 0.086 | 0.007 | 0.0013 | 0.036 | | 0.0048 | 0.0017 | | | 2.04 | Comparative Example |
| AH | 0.0031 | 0.230 | 0.462 | 0.016 | 0.014 | 0.0023 | — | — | 0.0033 | 0.0009 | | | — | Comparative Example |

The underline represents that the value is outside of the range of the present invention, and the empty field represents that the value is less than the detection lower limit.

TABLE 2-1

| | | Hot Rolling Process | | | Reheating Process | | |
|---|---|---|---|---|---|---|---|
| Steel | Hot-Rolled Steel Sheet | Steel Piece Heating Temperature °C. | Rolling Completion Temperature °C. | Average Cooling Rate °C./s | Highest Heating Temperature °C. | $K_{20}$ ×10$^4$ | Note |
| A | A1 | 1240 | 938 | 31 | 597 | 1.83 | Example |
| A | A2 | 1284 | 894 | 26 | 549 | 1.54 | Example |
| A | A3 | 1257 | 867 | 30 | 591 | 1.77 | Comparative Example |
| B | B1 | 1215 | 974 | 61 | 647 | 1.74 | Example |
| B | B2 | 1276 | 921 | 36 | 618 | 1.63 | Example |
| C | C1 | 1227 | 953 | 58 | 507 | 1.72 | Example |
| C | C2 | 1216 | 913 | 30 | 575 | 1.86 | Example |
| C | C3 | 1270 | 908 | 29 | 520 | 1.45 | Comparative Example |
| D | D | 1233 | 956 | 28 | 543 | 1.92 | Example |
| E | E | 1257 | 978 | 35 | 617 | 1.93 | Example |
| F | F | 1243 | 1021 | 43 | 648 | 2.07 | Example |
| G | G | 1231 | 935 | 46 | 524 | 1.63 | Example |
| H | H | 1255 | 906 | 53 | 578 | 2.00 | Example |
| I | I | 1237 | 985 | 43 | 672 | 1.98 | Example |
| J | J | 1262 | 1030 | 68 | 607 | 1.74 | Example |
| K | K1 | 1250 | 895 | 24 | 582 | 1.77 | Example |
| K | K2 | 1306 | 914 | 35 | 531 | 1.83 | Example |
| K | K3 | 1292 | 935 | 33 | 721 | — | Comparative Example |
| L | L | 1244 | 918 | 57 | 679 | 1.85 | Example |
| M | M | 1249 | 958 | 36 | 614 | 1.68 | Example |
| N | N | 1264 | 961 | 51 | 597 | 1.87 | Example |
| O | O | 1232 | 926 | 31 | 607 | 2.01 | Example |
| P | P | 1219 | 948 | 59 | 540 | 1.66 | Example |
| Q | Q | 1266 | 930 | 36 | 618 | 1.77 | Example |
| R | R | 1236 | 921 | 40 | 657 | 1.90 | Example |

The underline represents that the value is outside of the range of the present invention.

TABLE 2-2

| Steel | Hot-Rolled Steel Sheet | Hot Rolling Process | | | Reheating Process | | |
|---|---|---|---|---|---|---|---|
| | | Steel Piece Heating Temperature °C. | Rolling Completion Temperature °C. | Average Cooling Rate °C./s | Highest Heating Temperature °C. | $K_{20} \times 10^4$ | Note |
| S | S | 1250 | 969 | 45 | 562 | 1.64 | Example |
| T | T | 1250 | 942 | 48 | 642 | 1.93 | Example |
| U | U | 1253 | 913 | 29 | 547 | 1.57 | Example |
| V | V | 1302 | 982 | 49 | 566 | 1.64 | Example |
| W | W1 | 1241 | 949 | 36 | 655 | 1.82 | Example |
| W | W2 | <u>1176</u> | 955 | 42 | 656 | 1.84 | Comparative Example |
| W | W3 | 1240 | 885 | 29 | 647 | 1.63 | Example |
| X | X1 | 1227 | 921 | 31 | 639 | 1.84 | Example |
| X | X2 | 1209 | 914 | 28 | 541 | 1.72 | Example |
| X | X3 | 1230 | 924 | <u>17</u> | 562 | 1.58 | Comparative Example |
| Y | Y1 | 1230 | 913 | 59 | 539 | 1.73 | Example |
| Y | Y2 | 1313 | 897 | 39 | 638 | 1.69 | Example |
| Y | Y3 | 1255 | 931 | 33 | <u>465</u> | — | Comparative Example |
| Z | Z1 | 1284 | 937 | 37 | 676 | 1.92 | Example |
| Z | Z2 | <u>1187</u> | 944 | 39 | 623 | 1.80 | Comparative Example |
| Z | Z3 | 1248 | 936 | 57 | 691 | 1.90 | Example |
| Z | Z4 | 1263 | 937 | 33 | 534 | <u>1.47</u> | Comparative Example |
| <u>AA</u> | AA | 1208 | 915 | 40 | 601 | 2.00 | Comparative Example |
| <u>AB</u> | AB | 1264 | 907 | 29 | 630 | 1.74 | Comparative Example |
| <u>AC</u> | AC | 1233 | 951 | 58 | 642 | 1.84 | Comparative Example |
| <u>AD</u> | AD | 1280 | 926 | 37 | 615 | 1.92 | Comparative Example |
| <u>AE</u> | AE | 1210 | 948 | 37 | 630 | 1.78 | Comparative Example |
| <u>AF</u> | AF | 1272 | 927 | 32 | 616 | 1.80 | Comparative Example |
| <u>AG</u> | AG | 1273 | 934 | 50 | 632 | 1.85 | Comparative Example |
| <u>AH</u> | AH | 1217 | 916 | 34 | 626 | 1.70 | Comparative Example |

The underline represents that tile value is outside of the range of the present invention.

TABLE 3-1

| Experimental Example | Steel | Hot-Rolled Steel Sheet | Cold Rolling Process | | | Annealing Process | | | | Temper Rolling Process | Plating Process | Note |
|---|---|---|---|---|---|---|---|---|---|---|---|---|
| | | | Sheet Thickness before Rolling mm | Sheet Thickness after Rolling mm | Total Rolling Reduction % | Rolling completion Temperature °C. | Heating Annealing Temperature °C. | Cooling $\sum_{i=1}^{10} R_i$ | $R_{10} \cdot \sum_{j=1}^{10} P_j$ | Tension MPa | Total Rolling Reduction of Temper Rolling % | | |
| 1 | A | A1 | 3.0 | 0.8 | 73 | 128 | 739 | 6.9 | 3.9 | 27 | 0.25 | | Example |
| 2 | A | A1 | 1.8 | 0.4 | 78 | 96 | 725 | <u>0.8</u> | 1.6 | 22 | 1.15 | | Comparative Example |
| 3 | A | A1 | 2.0 | 0.4 | 80 | 107 | 754 | 4.5 | 1.3 | 25 | 0.72 | | Example |
| 4 | A | A2 | 4.2 | 1.0 | 76 | 143 | 755 | 7.0 | 3.2 | 27 | 0.41 | Zn Alloy Plating | Example |
| 5 | A | A2 | 3.4 | 0.4 | 88 | 194 | 783 | 12.3 | 3.4 | 28 | 1.21 | GA | Example |
| 6 | A | A2 | 5.4 | 0.4 | <u>93</u> | 152 | 752 | 9.9 | 5.5 | 25 | 0.91 | | Comparative Example |
| 7 | A | <u>A3</u> | 4.4 | 1.0 | 77 | 131 | 776 | 8.2 | 3.2 | 27 | 0.76 | | Comparative Example |
| 8 | B | B1 | 5.6 | 1.0 | 82 | 140 | 729 | 6.4 | 2.2 | 34 | 0.71 | GI | Example |
| 9 | B | B1 | 1.6 | 0.3 | 81 | 238 | 770 | 13.8 | 5.2 | 26 | 0.66 | Alloy Galvannealing | Example |

TABLE 3-1-continued

| Experimental Example | Steel | Hot-Rolled Steel Sheet | Cold Rolling Process | | | | Annealing Process | | | | Temper Rolling Process | Plating Process | Note |
|---|---|---|---|---|---|---|---|---|---|---|---|---|---|
| | | | Sheet Thickness before Rolling mm | Sheet Thickness after Rolling mm | Total Rolling Reduction % | Rolling completion Temperature °C | Heating Annealing Temperature °C | $\sum_{i=1}^{10} R_i$ | Cooling $R_{10} \cdot \sum_{j=1}^{10} P_j$ | Tension MPa | Total Rolling Reduction of Temper Rolling % | | |
| 10 | B | B2 | 4.4 | 1.2 | 73 | 145 | 779 | 7.6 | 7.7 | 39 | 0.84 | | Example |
| 11 | B | B2 | 4.6 | 0.7 | 85 | 131 | 773 | 3.8 | 2.4 | 28 | <u>0.03</u> | | Comparative Example |
| 12 | C | C1 | 4.8 | 1.3 | 73 | 154 | 755 | 6.6 | 2.5 | 30 | 0.95 | Deposition | Example |
| 13 | C | C2 | 6.0 | 1.1 | 82 | 203 | 761 | 5.5 | 2.0 | 29 | 0.29 | | Example |
| 14 | C | C2 | 5.4 | 1.8 | 67 | 129 | 738 | 1.2 | 3.3 | 27 | 1.19 | | Example |
| 15 | C | C2 | 3.0 | 1.4 | <u>53</u> | 114 | 786 | 11.9 | 6.9 | 30 | 1.01 | | Comparative Example |
| 16 | C | <u>C3</u> | 1.8 | 0.3 | 83 | 121 | 761 | 5.7 | 2.4 | 26 | 0.86 | | Comparative Example |
| 17 | D | D | 5.8 | 1.2 | 79 | 184 | 798 | 6.6 | 2.8 | 34 | 0.12 | | Example |
| 18 | E | E | 3.8 | 0.6 | 84 | 219 | 783 | 13.4 | 10.1 | 40 | 0.85 | GA | Example |
| 19 | F | F | 5.4 | 1.2 | 78 | 189 | 760 | 2.3 | 2.1 | 27 | 0.73 | | Example |
| 20 | G | G | 3.2 | 0.7 | 78 | 143 | 783 | 8.4 | 4.1 | 31 | 0.96 | | Example |
| 21 | H | H | 5.2 | 1.8 | 65 | 228 | 815 | 13.6 | 4.1 | 30 | 1.17 | GI | Example |
| 22 | I | I | 1.6 | 0.3 | 81 | 186 | 774 | 5.7 | 3.5 | 57 | 1.59 | | Example |
| 23 | J | J | 4.0 | 1.2 | 70 | 147 | 774 | 10.9 | 10.8 | 31 | 1.13 | | Example |
| 24 | K | K1 | 5.8 | 1.6 | 72 | 127 | 822 | 11.4 | 6.0 | 29 | 0.84 | GI | Example |
| 25 | K | K2 | 5.2 | 1.8 | 65 | 150 | 708 | 3.6 | 3.0 | 32 | 0.65 | | Example |
| 26 | K | K2 | 2.2 | 0.7 | 68 | 184 | 774 | 9.6 | 5.2 | 37 | 1.18 | GA | Example |
| 27 | K | K2 | 6.0 | 1.3 | 78 | 179 | 750 | 3.8 | 1.7 | <u>No Bending</u> | 1.53 | | Comparative Example |
| 28 | K | K2 | 3.6 | 0.7 | 81 | <u>298</u> | 738 | 4.2 | 2.8 | 36 | 0.95 | | Comparative Example |
| 29 | K | K3 | 5.6 | 1.0 | 82 | 183 | 477 | — | — | 29 | 0.88 | | Comparative Example |
| 30 | L | L | 2.2 | 0.5 | 77 | 183 | 769 | 8.6 | 3.0 | 49 | 0.77 | | Example |
| 31 | M | M | 5.4 | 1.8 | 67 | 147 | 809 | 10.5 | 3.1 | 40 | 0.88 | EG | Example |
| 32 | N | N | 4.0 | 1.4 | 65 | 139 | 771 | 5.9 | 2.4 | 28 | 0.50 | | Example |
| 33 | N | N | 4.8 | 1.7 | 65 | 172 | 801 | 13.1 | <u>16.5</u> | 29 | 1.33 | | Comparative Example |
| 34 | O | O | 4.0 | 0.6 | 85 | 178 | 817 | 10.1 | 7.1 | 25 | 1.39 | | Example |
| 35 | p | P | 1.6 | 0.3 | 81 | 139 | 784 | 13.1 | 10.2 | 30 | 0.56 | GA | Example |
| 36 | Q | Q | 3.6 | 1.2 | 67 | 141 | 748 | 7.3 | 5.3 | 28 | 0.46 | | Example |
| 37 | R | R | 1.8 | 0.5 | 67 | 148 | 778 | 10.1 | 6.3 | 26 | 1.05 | GA | Example |

The underline represents that the value is outside of the range of the present invention.

TABLE 3-2

| Experimental Example | Steel | Hot-Rolled Steel Sheet | Cold Rolling Process | | | | Annealing Process | | | | Temper Rolling Process | Plating Process | Note |
|---|---|---|---|---|---|---|---|---|---|---|---|---|---|
| | | | Sheet Thickness before Rolling mm | Sheet Thickness after Rolling mm | Total Rolling Reduction % | Rolling completion Temperature °C | Heating Annealing Temperature °C | $\sum_{i=1}^{10} R_i$ | Cooling $R_{10} \cdot \sum_{j=1}^{10} P_j$ | Tension MPa | Total Rolling Reduction of Temper Rolling % | | |
| 38 | S | S | 3.2 | 0.7 | 78 | 153 | 767 | 9.0 | 4.9 | 29 | 0.60 | Zn Plating | Example |
| 39 | T | T | 2.6 | 0.7 | 73 | 173 | 814 | 9.6 | 3.5 | 34 | 0.27 | | Example |
| 40 | T | T | 1.8 | 0.3 | 83 | 108 | 777 | 7.2 | 2.4 | <u>12</u> | 1.21 | | Comparative Example |
| 41 | U | U | 4.4 | 1.3 | 70 | 92 | 761 | 11.7 | 4.9 | 29 | 1.20 | GI | Example |
| 42 | V | V | 1.8 | 0.4 | 78 | 109 | 727 | 5.5 | 8.8 | 28 | 0.74 | | Example |
| 43 | V | V | 5.6 | 1.3 | 77 | 153 | 739 | 6.3 | 1.4 | 25 | <u>3.00</u> | | Comparative Example |
| 44 | W | W1 | 5.4 | 0.8 | 85 | 225 | 779 | 5.0 | 1.9 | 34 | 0.55 | | Example |
| 45 | W | W1 | 2.6 | 0.6 | 77 | 138 | 800 | 11.0 | 5.0 | 23 | 0.47 | GI | Example |

TABLE 3-2-continued

| | | | Cold Rolling Process | | | | Annealing Process | | | Temper Rolling Process | | |
|---|---|---|---|---|---|---|---|---|---|---|---|---|
| | | | Sheet Thickness before Rolling mm | Sheet Thickness after Rolling mm | Total Rolling Reduction % | Rolling completion Temperature ° C. | Heating Annealing Temperature ° C. | Cooling | | Total Rolling Reduction of Temper Rolling % | | |
| Experimental Example | Steel | Hot-Rolled Steel Sheet | | | | | | $\sum_{i=1}^{10} R_i$ | $R_{10} \cdot \sum_{j=1}^{10} P_j$ | Tension MPa | Plating Process | Note |
| 46 | W | W1 | 3.0 | 0.9 | 70 | 155 | <u>681</u> | — | — | 39 | 1.05 | | Comparative Example |
| 47 | W | <u>W2</u> | 2.4 | 0.7 | 71 | 111 | 735 | 5.5 | 4.9 | 44 | 1.54 | | Comparative Example |
| 48 | W | W3 | 2.4 | 0.7 | 71 | 141 | 761 | 11.2 | 2.6 | 35 | 0.75 | GA | Example |
| 49 | X | X1 | 1.8 | 0.6 | 67 | 102 | 721 | 5.1 | 4.1 | 31 | 0.72 | | Example |
| 50 | X | X1 | 2.6 | 0.7 | 73 | 115 | 793 | 14.6 | 12.0 | 32 | 0.44 | GI | Example |
| 51 | X | X1 | 3.1 | 1.1 | 65 | 133 | 724 | 1.6 | <u>0.8</u> | 29 | 0.38 | | Comparative Example |
| | X | X1 | | | | | | | | | | | |
| 52 | X | X2 | 5.6 | 1.3 | 77 | 167 | 723 | 5.1 | 6.7 | 32 | 0.13 | GA | Example |
| 53 | X | <u>X3</u> | 4.0 | 1.3 | 68 | 151 | 793 | 12.0 | 4.8 | 30 | 1.25 | | Comparative Example |
| 54 | Y | Y1 | 5.8 | 1.3 | 78 | 103 | 757 | 7.6 | 3.8 | 31 | 1.83 | | Example |
| 55 | Y | Y1 | 3.2 | 0.6 | 81 | 146 | 744 | 7.6 | 14.3 | 27 | 0.88 | GA | Example |
| 56 | Y | Y1 | 2.4 | 0.6 | 75 | 121 | 776 | <u>18.7</u> | 7.3 | 26 | 0.69 | | Comparative Example |
| 57 | Y | Y2 | 5.2 | 1.0 | 81 | 134 | 787 | 11.4 | 12.2 | 27 | 1.14 | GA | Example |
| 58 | Y | <u>Y3</u> | 3.4 | 1.1 | 68 | 146 | 747 | — | — | 25 | 0.26 | | Comparative Example |
| 59 | Z | Z1 | 2.1 | 0.8 | 62 | 140 | 722 | 4.6 | 3.0 | 33 | 0.07 | | Example |
| 60 | Z | Z1 | 3.4 | 1.2 | 65 | 191 | 716 | 3.7 | 5.5 | 32 | 1.68 | GA | Example |
| 61 | Z | Z1 | 2.4 | 0.6 | 75 | 187 | <u>871</u> | — | — | 32 | 0.82 | | Comparative Example |
| 62 | Z | <u>Z2</u> | 3.0 | 0.5 | 83 | 187 | 778 | 13.3 | 3.6 | 34 | 0.65 | | Comparative Example |
| 63 | Z | <u>Z3</u> | 2.4 | 0.4 | 83 | 172 | 742 | 4.3 | 2.0 | 33 | 0.58 | EG | Example |
| 64 | Z | <u>Z4</u> | 1.8 | 0.4 | 78 | 183 | 776 | 11.7 | 3.9 | 31 | 1.27 | | Comparative Example |
| 65 | <u>AA</u> | <u>AA</u> | 5.6 | 1.9 | 66 | 204 | 801 | 12.6 | 4.5 | 29 | 1.17 | | Comparative Example |
| 66 | <u>AB</u> | <u>AB</u> | 3.4 | 0.9 | 74 | 147 | 763 | 7.7 | 1.4 | 29 | 0.90 | | Comparative Example |
| 67 | <u>AC</u> | <u>AC</u> | 2.2 | 0.5 | 77 | 109 | 789 | 5.5 | 1.7 | 30 | 0.92 | | Comparative Example |
| 68 | <u>AD</u> | <u>AD</u> | 2.0 | 0.4 | 80 | 154 | 769 | 7.0 | 9.7 | 30 | 0.95 | | Comparative Example |
| 69 | <u>AE</u> | <u>AE</u> | 3.2 | 0.9 | 72 | 166 | 739 | 3.9 | 3.3 | 45 | 1.12 | | Comparative Example |
| 70 | <u>AF</u> | <u>AF</u> | 3.0 | 0.8 | 73 | 219 | 767 | 2.8 | 2.0 | 44 | 0.93 | | Comparative Example |
| 71 | <u>AG</u> | <u>AG</u> | 4.8 | 1.6 | 67 | 195 | 798 | 8.5 | 2.4 | 34. | 0.86 | | Comparative Example |
| 72 | <u>AH</u> | <u>AH</u> | 3.0 | 1.0 | 67 | 153 | 754 | 9.1 | 2.8 | 27 | 0.17 | | Comparative Example |
| 73 | J | J | 4.0 | 1.5 | 63 | 225 | 793 | 14.2 | 14.3 | 24 | 0.30 | | Example |
| 74 | W | W3 | 2.4 | 0.4 | 83 | 104 | 758 | 1.6 | 1.9 | 30 | 0.62 | | Example |

The underline represents that the value is outside of the range of the present invention.

TABLE 4-1

| | | | Properties of Steel Sheet | | | | | Fe Content in GA or Alloy Galvannealed Layer mass % | Properties | | | | |
|---|---|---|---|---|---|---|---|---|---|---|---|---|---|
| Experimental Example | Steel | Hot-Rolled Steel Sheet | Ferrite vol % | Proportion of Unrecrystallized Ferrite % | Average Grain Size of Ferrite μm | w × λ | Plated Layer | | YS MPa | TS MPa | YR | ΔBH MPa | Note |
| 1 | A | A1 | 100 | 0 | 8.7 | 0.37 | | | 122 | 293 | 0.42 | 37 | Example |
| <u>2</u> | A | A1 | 100 | <u>11</u> | 6.5 | <u>0.15</u> | | | <u>193</u> | 290 | <u>0.67</u> | <u>10</u> | Comparative Example |
| 3 | A | A1 | 99 | 0 | 8.2 | 0.29 | | | 119 | 290 | 0.41 | 33 | Example |

TABLE 4-1-continued

| | | | Properties of Steel Sheet | | | | | | | | | |
|---|---|---|---|---|---|---|---|---|---|---|---|---|
| Experimental Example | Hot-Rolled Steel | Steel Sheet | Proportion of Unrecrystallized Ferrite vol % | Ferrite % | Average Grain Size of Ferrite μm | w × λ | Plated Layer | Fe Content in GA or Alloy Galvannealed Layer mass % | YS MPa | TS MPa | YR | ΔBH MPa | Note |
| 4 | A | A2 | 100 | 0 | 8.1 | 0.26 | Zn Alloy Plated | | 131 | 295 | 0.44 | 28 | Example |
| 5 | A | A2 | 100 | 4 | 8.6 | 0.24 | GA | 10.6 | 158 | 326 | 0.49 | 30 | Example |
| <u>6</u> | A | A2 | 100 | <u>13</u> | 9.5 | 0.22 | | | <u>206</u> | 279 | <u>0.74</u> | 25 | Comparative Example |
| <u>7</u> | A | <u>A3</u> | 100 | <u>8</u> | 10.0 | 0.27 | | | <u>197</u> | 277 | <u>0.71</u> | 28 | Comparative Example |
| 8 | B | B1 | 100 | 0 | 7.3 | 0.29 | GI | | 134 | 299 | 0.45 | 35 | Example |
| 9 | B | B1 | 100 | 2 | 8.5 | 0.32 | Alloy Galvannealed | 9.3 | 152 | 321 | 0.47 | 30 | Example |
| 10 | B | B2 | 100 | 0 | 13.0 | 0.25 | | | 132 | 294 | 0.45 | 22 | Example |
| <u>11</u> | B | B2 | 100 | 2 | 7.2 | <u>0.17</u> | | | 136 | 290 | 0.47 | <u>17</u> | Comparative Example |
| 12 | C | C1 | 99 | 0 | 8.2 | 0.27 | Deposited | | 169 | 361 | 0.47 | 28 | Example |
| 13 | C | C2 | 98 | 0 | 7.6 | 0.35 | | | 168 | 352 | 0.48 | 41 | Example |
| 14 | C | C2 | 99 | 1 | 6.4 | 0.31 | | | 175 | 359 | 0.49 | 32 | Example |
| <u>15</u> | A | C2 | 98 | <u>15</u> | 9.9 | 0.31 | | | <u>252</u> | 339 | <u>0.74</u> | 35 | Comparative Example |
| <u>16</u> | C | <u>C3</u> | 99 | 0 | 7.8 | <u>0.17</u> | | | 160 | 326 | 0.49 | <u>12</u> | Comparative Example |
| 17 | D | D | 96 | 0 | 9.0 | 0.21 | | | 175 | 360 | 0.49 | 27 | Example |
| 18 | E | E | 99 | 1 | 14.5 | 0.24 | GA | 8.5 | 174 | 402 | 0.43 | 28 | Example |
| 19 | F | F | 98 | 2 | 7.6 | 0.36 | | | 178 | 361 | 0.49 | 40 | Example |
| 20 | G | G | 97 | 0 | 12.4 | 0.22 | | | 177 | 359 | 0.49 | 24 | Example |
| 21 | H | H | 98 | 1 | 9.5 | 0.23 | GI | | 165 | 343 | 0.48 | 24 | Example |
| 22 | I | I | 99 | 0 | 11.6 | 0.28 | | | 174 | 375 | 0.46 | 29 | Example |
| 23 | J | J | 99 | 0 | 14.6 | 0.27 | | | 164 | 371 | 0.44 | 22 | Example |
| 24 | K | K1 | 99 | 0 | 18.5 | 0.31 | GI | | 143 | 298 | 0.48 | 29 | Example |
| 25 | K | K2 | 99 | 0 | 8.7 | 0.22 | | | 155 | 311 | 0.50 | 21 | Example |
| 26 | K | K2 | 99 | 0 | 11.9 | 0.26 | GA | 12.8 | 149 | 316 | 0.47 | 28 | Example |
| <u>27</u> | K | K2 | 98 | 0 | 7.6 | <u>0.18</u> | | | 172 | 312 | <u>0.55</u> | <u>13</u> | Comparative Example |
| <u>28</u> | K | K2 | 99 | <u>17</u> | 8.9 | 0.30 | | | <u>216</u> | 325 | <u>0.66</u> | 24 | Comparative Example |
| <u>29</u> | K | <u>K3</u> | 100 | 3 | 8.1 | <u>0.15</u> | | | 168 | 322 | <u>0.52</u> | <u>7</u> | Comparative Example |
| 30 | L | L | 99 | 0 | 10.0 | 0.23 | | | 178 | 431 | 0.41 | 25 | Example |
| 31 | M | M | 100 | 0 | 9.4 | 0.21 | EG | | 168 | 337 | 0.50 | 23 | Example |
| 32 | N | N | 100 | 0 | 8.5 | 0.35 | | | 146 | 308 | 0.48 | 27 | Example |
| <u>33</u> | N | N | 100 | 0 | 17.8 | <u>0.13</u> | | | 150 | 284 | <u>0.53</u> | <u>8</u> | Comparative Example |
| 34 | O | O | 99 | 1 | 10.6 | 0.30 | | | 116 | 308 | 0.38 | 33 | Example |
| 35 | P | P | 99 | 0 | 13.0 | 0.32 | GA | 8.4 | 171 | 348 | 0.49 | 33 | Example |
| 36 | Q | Q | 98 | 0 | 10.9 | 0.24 | | | 164 | 331 | 0.49 | 37 | Example |
| 37 | R | R | 100 | 0 | 15.3 | 0.27 | GA | 9.7 | 161 | 361 | 0.45 | 27 | Example |

The underline represents that the value is outside of the range of the present invention or represents undesirable properties.

TABLE 4-2

| | | | Properties of Steel Sheet | | | | | | | | | |
|---|---|---|---|---|---|---|---|---|---|---|---|---|
| Experimental Example | Hot-Rolled Steel | Steel Sheet | Proportion of Unrecrystallized Ferrite Vol % | Ferrite % | Average Grain Size of Ferrite μm | w × λ | Plated Layer | Fe Content in GA or Alloy Galvannealed Layer mass % | YS MPa | TS MPa | YR | ΔBH MPa | Note |
| 38 | S | S | 99 | 0 | 9.9 | 0.25 | Zu Plated | | 159 | 348 | 0.46 | 30 | Example |
| 39 | T | T | 99 | 0 | 14.2 | 0.22 | | | 154 | 322 | 0.48 | 25 | Example |
| <u>40</u> | T | T | 99 | 0 | 10.7 | <u>0.16</u> | | | 157 | 338 | 0.47 | <u>15</u> | Comparative Example |
| 41 | U | U | 100 | 0 | 8.2 | 0.39 | GI | | 153 | 308 | 0.50 | 28 | Example |
| 42 | V | V | 100 | 0 | 9.9 | 0.33 | | | 132 | 300 | 0.44 | 41 | Example |
| <u>43</u> | V | V | 96 | <u>10</u> | 8.3 | <u>0.14</u> | | | <u>203</u> | 385 | <u>0.53</u> | <u>13</u> | Comparative Example |
| 44 | W | W1 | 99 | 2 | 8.3 | 0.23 | | | 173 | 363 | 0.48 | 30 | Example |
| 45 | W | W1 | 99 | 0 | 9.3 | 0.23 | GI | | 175 | 372 | 0.47 | 25 | Example |

TABLE 4-2-continued

| | | | Properties of Steel Sheet | | | | | | | | | |
|---|---|---|---|---|---|---|---|---|---|---|---|---|
| Experimental Example | Steel | Hot-Rolled Steel Sheet | Ferrite Vol % | Proportion of Unrecrystallized Ferrite % | Average Grain Size of Ferrite μm | w × λ | Plated Layer | Fe Content in GA or Alloy Galvannealed Layer mass % | YS MPa | TS MPa | YR | ΔBH MPa | Note |
| 46 | W | W1 | 100 | 12 | 22.3 | 0.17 | | | 256 | 354 | 0.72 | 16 | Comparative Example |
| 47 | W | W2 | 99 | 0 | 9.5 | 0.16 | | | 172 | 360 | 0.48 | 9 | Comparative Example |
| 48 | W | W3 | 99 | 0 | 9.5 | 0.27 | GA | 10.3 | 170 | 354 | 0.48 | 30 | Example |
| 49 | X | X1 | 100 | 0 | 9.6 | 0.27 | | | 145 | 311 | 0.47 | 39 | Example |
| 50 | X | X1 | 100 | 0 | 13.3 | 0.31 | GI | | 134 | 297 | 0.45 | 24 | Example |
| 51 | X | X1 | 91 | 0 | 6.5 | 0.34 | | | 215 | 374 | 0.57 | 29 | Comparative Example |
| 52 | X | X2 | 100 | 0 | 12.9 | 0.22 | GA | 9.4 | 128 | 287 | 0.45 | 26 | Example |
| 53 | X | X3 | 100 | 0 | 15.7 | 0.17 | | | 137 | 290 | 0.47 | 9 | Comparative Example |
| 54 | Y | Y1 | 99 | 0 | 7.9 | 0.29 | | | 156 | 317 | 0.49 | 31 | Example |
| 55 | Y | Y1 | 99 | 0 | 12.5 | 0.23 | GA | 12.2 | 157 | 323 | 0.49 | 26 | Example |
| 56 | Y | Y1 | 99 | 0 | 18.8 | 0.16 | | | 142 | 308 | 0.46 | 11 | Comparative Example |
| 57 | Y | Y2 | 99 | 0 | 14.5 | 0.30 | GA | 8.4 | 141 | 317 | 0.44 | 28 | Example |
| 58 | Y | Y3 | 100 | 2 | 10.5 | 0.17 | | | 174 | 323 | 0.54 | 12 | Comparative Example |
| 59 | Z | Z1 | 99 | 0 | 10.1 | 0.25 | | | 169 | 384 | 0.44 | 30 | Example |
| 60 | Z | Z1 | 98 | 0 | 8.6 | 0.32 | GA | 7.4 | 171 | 364 | 0.47 | 27 | Example |
| 61 | Z | Z1 | 100 | 0 | 23.2 | 0.15 | | | 169 | 361 | 0.47 | 9 | Comparative Example |
| 62 | Z | Z2 | 98 | 0 | 12.4 | 0.12 | | | 175 | 385 | 0.45 | 14 | Comparative Example |
| 63 | Z | Z3 | 98 | 0 | 8.6 | 0.34 | EG | | 175 | 390 | 0.45 | 35 | Example |
| 64 | Z | Z4 | 99 | 0 | 11.1 | 0.14 | | | 169 | 360 | 0.47 | 12 | Comparative Example |
| 65 | AA | AA | 98 | 0 | 18.2 | 0.29 | | | 207 | 373 | 0.55 | 28 | Comparative Example |
| 66 | AB | AB | 95 | 0 | 12.5 | 0.13 | | | 177 | 338 | 0.52 | 15 | Comparative Example |
| 67 | AC | AC | 97 | 13 | 6.7 | 0.28 | | | 226 | 427 | 0.53 | 26 | Comparative Example |
| 68 | AD | AD | 99 | 9 | 9.5 | 0.30 | | | 240 | 348 | 0.69 | 27 | Comparative Example |
| 69 | AE | AE | 99 | 11 | 8.0 | 0.29 | | | 237 | 343 | 0.69 | 34 | Comparative Example |
| 70 | AF | AF | 99 | 1 | 8.3 | 0.23 | | | 280 | 485 | 0.58 | 30 | Comparative Example |
| 71 | AG | AG | 69 | 0 | 8.0 | 0.38 | | | 232 | 413 | 0.56 | 25 | Comparative Example |
| 72 | AH | AH | 100 | 0 | 16.3 | 0.33 | | | 281 | 329 | 0.85 | 13 | Comparative Example |
| 73 | J | J | 99 | 0 | 17.3 | 0.22 | | | 101 | 267 | 0.38 | 21 | Example |
| 74 | W | W3 | 99 | 0 | 5.0 | 0.21 | | | 178 | 365 | 0.49 | 22 | Example |

The underline represents that the value is outside of the range of the present invention or represents undesirable properties.

Among steels A to AH shown in Tables 1-1 and 1-2, the steels AA to AH shown in Table 1-2 are comparative examples where the composition was outside of the range defined by the present invention.

In the steel AA, the C content was higher than the range of the present invention. In the steel sheet according to Experiment Example 65 obtained using this steel, the yield strength and the yield ratio were high.

In the composition of the steel AB, the value of the middle side of Expression (1) was less than that of the range of the present invention. In the steel sheet according to Experiment Example 66 obtained using this steel, the yield ratio was high, and sufficient bake hardenability (BH property) was not able to be obtained.

In the composition of the steel AC, the value of the middle side of Expression (1) was more than that of the range of the present invention. In the steel sheet according to Experiment Example 67 obtained using this steel, an excess amount of unrecrystallized ferrite remained, and the yield strength and the yield ratio were excessively high.

In the steel AD, the Ti content was higher than the range of the present invention. In the steel sheet according to Experiment Example 68 obtained using this steel, an excess amount of unrecrystallized ferrite remained, and the yield strength and the yield ratio were excessively high.

In the steel AE, the Nb content was higher than the range of the present invention. In the steel sheet according to Experiment Example 69 obtained using this steel, an excess amount of unrecrystallized ferrite remained, and the yield strength and the yield ratio were excessively high.

In the steel AF, the Si content was higher than the range of the present invention. In the steel sheet according to Experiment Example 70 obtained using this steel, the yield strength and the yield ratio were excessively high.

In the steel AG, the Mn content was higher than the range of the present invention. In the steel sheet according to Experiment Example 71 obtained using this steel, the volume percentage of ferrite was insufficient, and the yield strength and the yield ratio were high.

The steel AH did not include both Ti and Nb. In the steel sheet according to Experiment Example 72 obtained using this steel, the yield strength and the yield ratio were high, and sufficient bake hardenability (BH property) was not able to be obtained.

Experiment Examples 7, 47, 53, and 62 were comparative examples where the conditions of the hot rolling process were outside of the range of the present invention.

Experiment Examples 47 and 62 were comparative examples in which the cast piece heating temperature in the hot rolling process was low and the value of w×λ was small. Therefore, sufficient bake hardenability was not able to be obtained.

Experiment Example 7 was a comparative example in which the rolling completion temperature in the hot rolling process was low and an excess amount of unrecrystallized ferrite remained. Therefore, the yield strength and the yield ratio were excessively high.

Experiment Example 53 was a comparative example in which the average cooling rate in the temperature range of the hot rolling completion temperature to 500° C. in the hot rolling process was slow and the value of w×λ was small. Therefore, sufficient bake hardenability was not able to be obtained.

Experiment Examples 16, 29, 58, and 64 were comparative examples in which the conditions of the reheating process were outside of the range of the present invention.

Experiment Example 29 was a comparative example in which the maximum reheating temperature in the reheating process was high and the value of w×λ was small. Therefore, the yield ratio was excessively high and sufficient bake hardenability was not able to be obtained.

Experiment Example 58 was a comparative example in which the maximum reheating temperature in the reheating process was low and the value of w×λ was small. Therefore, the yield ratio was high and sufficient bake hardenability was not able to be obtained.

Experiment Examples 16 and 64 were comparative examples in which the temperature history in the reheating process did not satisfy Expression (3) ($K_{20}$ was low) and the value of w×λ was small. Therefore, sufficient bake hardenability was not able to be obtained.

Experiment Examples 6, 15, and 28 were comparative examples in which the conditions of the cold rolling process were outside of the range of the present invention.

Experiment Example 6 was a comparative example in which the total rolling reduction in the cold rolling process was high and an excess amount of unrecrystallized ferrite remained. Therefore, the yield strength and the yield ratio were high.

Experiment Example 15 was a comparative example in which the total rolling reduction in the cold rolling process was low and an excess amount of unrecrystallized ferrite remained. Therefore, the yield strength and the yield ratio were high.

Experiment Example 28 was a comparative example in which the rolling completion temperature in the cold rolling process was high and an excess amount of unrecrystallized ferrite remained. Therefore, the yield strength and the yield ratio were high.

Experiment Examples 2, 27, 33, 40, 46, 51, 56, and 61 were comparative examples where the conditions of the annealing process were outside of the range of the present invention.

Experiment Example 61 was a comparative example in which the annealing temperature during retention in the annealing process was high and the value of w×λ was small. Therefore, sufficient bake hardenability was not able to be obtained.

Experiment Example 46 was a comparative example in which the annealing temperature during retention in the annealing process was low, an excess amount of unrecrystallized ferrite remained, and the value of w×λ was small. Therefore, the yield strength and the yield ratio were high, and sufficient bake hardenability was not able to be obtained.

Experiment Example 56 was a comparative example in which the temperature history during heating in the annealing process did not satisfy Expression (4) and the value of w×λ was small. Therefore, sufficient bake hardenability was not able to be obtained.

Experiment Example 2 was a comparative example in which the temperature history during heating in the annealing process did not satisfy Expression (4), an excess amount of unrecrystallized ferrite remained, and the value of w×λ was small. Therefore, the yield strength and the yield ratio were high, and sufficient bake hardenability was not able to be obtained.

Experiment Example 33 was a comparative example in which the temperature history during cooling in the annealing process did not satisfy Expression (5), the value of w×λ was small, the yield ratio was high, and sufficient bake hardenability was not able to be obtained.

Experiment Example 51 was a comparative example in which the temperature history during cooling in the annealing process did not satisfy Expression (5), an excess amount of structures other than ferrite were formed, and the yield strength and the yield ratio were high.

Experiment Example 27 was a comparative example in which bending was performed in the temperature range of 80° C. to 500° C. during cooling in the annealing process and the value of w×λ was small. Therefore, the yield ratio was high and sufficient bake hardenability was not able to be obtained.

Experiment Example 40 was a comparative example in which bending was performed in the temperature range of 80° C. to 500° C. during cooling in the annealing process without applying a sufficient tension and the value of w×λ was small. Therefore, sufficient bake hardenability was not able to be obtained.

Experiment Examples 11 and 43 were comparative examples where the conditions of the temper rolling process were outside of the range of the present invention.

Experiment Example 43 was a comparative example in which the total rolling reduction of temper rolling in the temper rolling process was high, an excess amount of unrecrystallized ferrite remained, and the value of w×λ was small. Therefore, the yield strength and the yield ratio were high, and sufficient bake hardenability was not able to be obtained.

Experiment Example 11 was a comparative example in which the total rolling reduction of temper rolling in the temper rolling process was low and the value of w×λ was small. Therefore, sufficient bake hardenability was not able to be obtained.

Experiment Examples other than Comparative Examples described above were Examples according to the present invention. It was found that the steel sheets described as Examples were manufactured using the manufacturing method satisfying the manufacturing conditions according to the present invention such that the yield strength was able to be reduced and high bake hardenability was obtained even in a high strain region.

Experiment Examples 4, 5, 8, 9, 12, 18, 21, 24, 26, 31, 35, 37, 38, 41, 45, 48, 50, 52, 55, 57, 60, and 63 are examples where the plated steel sheets according to the present invention were obtained by performing plating.

Experiment Examples 8, 21, 24, 41, 45, and 50 were Examples in which a hot-dip galvanized steel sheet (GI) was obtained by cooling the steel sheet to 500° C. in the annealing process, dipping the steel sheet in a molten zinc bath, and cooling the steel sheet to room temperature.

Experiment Examples 5, 18, 26, 35, 37, 48, 52, 55, 57, and 60 were Examples in which hot-dip galvannealed steel sheet (GA) was obtained by cooling the steel sheet to 500° C. in the annealing process, dipping the steel sheet in a molten zinc bath and reheating the steel sheet to 560° C. for alloying and cooling the steel sheet to room temperature.

Experiment Examples 4 and 38 were Examples in which a zinc alloy plated steel sheet was obtained by cooling the steel sheet to 500° C. in the annealing process, dipping the steel sheet in a molten zinc alloy bath, and cooling the steel sheet to room temperature.

Experiment Example 9 was an Example in which an alloy galvannealed steel sheet was obtained by cooling the steel sheet to 500° C. in the annealing process, dipping the steel sheet in a molten zinc alloy bath and reheating the steel sheet to 580° C. for alloying and cooling the steel sheet to room temperature.

Experiment Example 12 was an Example in which a galvanized steel sheet was obtained by performing deposition plating after temper rolling.

Experiment Examples 31 and 63 were Examples in which an electrogalvanized steel sheet (EG) was obtained by performing electrogalvanizing after the annealing process.

INDUSTRIAL APPLICABILITY

As described above, according to the present invention, a steel sheet having excellent formability and BH property can be provided. The steel sheet according to the present invention is a steel sheet that is suitable for a significant reduction in the weight of a vehicle and for ensuring the protection and safety of a passenger. Therefore, the present invention is highly applicable to the steel sheet manufacturing industry and the automobile industry.

The invention claimed is:

1. A steel sheet comprising, as a composition, by mass %:
C: 0.0003% to 0.0100%;
Si: 0.005% to 1.500%;
Mn: 0.010% to 3.000%;
Al: 0.005% to 1.000%;
P: 0.100% or less;
S: 0.0200% or less;
N: 0.0150% or less;
O: 0.0100% or less;
V: 0% to 0.50%;
Cr: 0% to 1.00%;
Ni: 0% to 1.00%;
Cu: 0% to 1.00%;
Mo: 0% to 1.00%;
W: 0% to 1.00%;
B: 0% to 0.0100%;
Sn: 0% to 1.00%;
Sb: 0% to 0.20%;
one or two or more selected from the group of Ca, Ce, Mg, Zr, La, and REM: 0% to 0.0100% in total;
one or two selected from the group of Ti: 0.010% to 0.100% and Nb: 0.005% to 0.060%; and
a remainder including Fe and impurities,
wherein Expression (1) is satisfied,
a microstructure at a ¼ thickness position from a surface in a sheet thickness direction includes, by vol %, 95% or more ferrite, and 5% or less of a remainder of the microstructure, and the ferrite has a proportion of unrecrystallized ferrite of 5% or less, and
a half width w and an X-ray wavelength λ at a peak of (200) plane of the ferrite satisfy Expression (2), $$0.80 \leq \{(Ti/48-N/14)+Nb/93\}/(C/12) \leq 5.00 \quad (1),$$

$$w \times \lambda \geq 0.20 \quad (2),$$

wherein each of Ti, N, Nb, and C in Expression (1) represents a content by mass % of the element, and when the element is not included, 0 is substituted as the content of the element.

2. The steel sheet according to claim 1,
wherein the composition further includes, by mass %, one or two or more selected from the group of:
V: 0.01% to 0.50%;
Cr: 0.05% to 1.00%;
Ni: 0.05% to 1.00%;
Cu: 0.05% to 1.00%;
Mo: 0.03% to 1.00%;
W: 0.03% to 1.00%;
B: 0.0005% to 0.0100%;
Sn: 0.01% to 1.00%;
Sb: 0.005% to 0.20%; and
one or two or more selected from the group of Ca, Ce, Mg, Zr, La, and REM: 0.0001% to 0.0100% in total.

3. The steel sheet according to claim 1,
wherein an average grain size of the ferrite in the microstructure is 6.0 m to 15.0 m.

4. The steel sheet according to claim 1, comprising a galvanized layer on the surface.

5. The steel sheet according to claim 1, comprising a zinc alloy plated layer on the surface.

6. The steel sheet according to claim 4,
wherein a Fe content in the galvanized layer is 7.0% to 130.0% by mass %.

7. A method of manufacturing the steel sheet according to claim 1, comprising:
a hot-rolling process of heating a steel piece having the composition according to claim 1 to 1200° C. to 1320° C., completing hot rolling such that a hot rolling completion temperature is 880° C. or higher, and cooling the steel piece to obtain a hot-rolled steel sheet such that an average cooling rate in a temperature range of the hot rolling completion temperature to 500° C. is 20° C./s or faster;
a reheating process of heating the hot-rolled steel sheet to a temperature range of 500° C. to 700° C.;
a cooling process of cooling the hot-rolled steel sheet to room temperature;
a cold rolling process of cold-rolling the hot-rolled steel sheet to obtain a cold-rolled steel sheet such that a total rolling reduction is 60% to 90% and a cold rolling completion temperature is 250° C. or lower;
an annealing process of heating the cold-rolled steel sheet to an annealing temperature of 700° C. to 850° C. and cooling to a temperature range of 80° C. or lower; and a temper rolling process of performing temper rolling on the cold-rolled steel sheet such that a total rolling reduction is 0.05% to 2.00%, wherein in the reheating process, Expression (3) is satisfied in a temperature range of 500° C. to 700° C., and in the annealing process, Expression (4) is satisfied in a temperature range of 700° C. to the annealing temperature during heating to the annealing temperature, and Expression (5) is satisfied in the temperature range of 500° C. to 700° C. during cooling from the annealing temperature, and bending is performed while applying a tension of 20 MPa or higher in a temperature range of 80° C. to 500° C., $$t_n = 10 \frac{T_{n-1} + 273}{T_n + 273} \cdot \log_{10} t_{n-1} - \left(1 - \frac{T_{n-1} + 273}{T_n + 273}\right) \cdot 21 \cdot \left(1 + 2.5 \cdot \sqrt{C \cdot (Nb + 4Ti)}\right) + \Delta t_K$$

$$K_n = (T_n + 273) \cdot \left\{\log_{10} t_n + 21 \cdot \left(1 + 2.5 \cdot \sqrt{C \cdot (Nb + 4Ti)}\right)\right\}$$

$$K_{20} \geq 1.50 \times 10^4$$

Expression (3)

in Expression (3), $K_{20}$ represents an index representing a degree of progress of precipitation of a Ti and/or Nb carbonitride in a 20th period when a temperature history in the temperature range of 500° C. to 700° C. of the reheating process is divided into 20 periods with respect to time, $t_n$ and $K_n$ are calculated when the temperature history in the temperature range of 500° C. to 700° C. of the reheating process is divided into 20 periods with respect to time and an average temperature in an n-th period is represented by $T_n[° C.]$, $\Delta t_K$ represents a time [hr·] in one of 20 periods into which a total residence time in the same temperature range is divided, each of C, Nb, and Ti represents a content [mass %] of the element, and $t_1 = \Delta t_K$, $$R_m = A \cdot \frac{\Delta t_R^{0.5}}{K_{20}} \cdot \exp\left(-\frac{B}{T_m}\right)$$

Expression (4)

$$1.0 \leq \sum_{i=1}^{10} R_i \leq 15.0$$

in Expression (4), $R_i$ represents an index representing a degree of progress of recrystallization in the temperature range of 700° C. to the annealing temperature and a degree of progress of diffusion of C from a Ti and/or Nb carbonitride present in a grain boundary into crystal grains, $R_m$ is calculated when a temperature history of the steel sheet from 700° C. to the annealing temperature during heating in the annealing process is divided into 10 periods with respect to time and an average temperature in an m-th period is represented by $T_m[° C.]$, $\Delta t_R$ represents a time [s] in one of 10 periods into which a total residence time in the temperature range of 700° C. to the annealing temperature is divided, $K_{20}$ is a value obtained by Expression (3), and A and B represent constant terms, A represents $9.67 \times 10^9$, and B represents $1.25 \times 10^4$, and $$P_k = D \cdot \left\{E \cdot (700 - T_k)^{1.5} + (700 - T_k)\right\} \cdot \exp\left(-\frac{F}{T_k}\right) \cdot \Delta t_p^{0.5}$$

Expression (5)

$$1.0 \leq R_{10} \cdot \sum_{j=1}^{10} p_j \leq 15.0$$

in Expression (5), $P_j$ represents an index representing a degree of progress of precipitation of C in a temperature range of 700° C. to 500° C., $P_k$ is calculated when a temperature history of the steel sheet from 700° C. to 500° C. during cooling in the annealing process is divided into 10 periods with respect to time and an average temperature in a k-th period is represented by $T_k[° C.]$, $\Delta t_p$ represents a time [s] in one of 10 periods into which a total residence time in the same temperature range is divided, $R_{10}$ represents a value obtained by substituting 10 into m of $R_m$ in Expression (4), and D, E, and F represent constant terms, D represents $4.47 \times 10^4$, E represents $2.11 \times 10^0$, and F represents $1.25 \times 10^4$.

8. The method of manufacturing a steel sheet according to claim 7, wherein during cooling in the annealing process, hot-dip galvanizing is performed on the cold-rolled steel sheet.

9. The method of manufacturing a steel sheet according to claim 7, wherein during cooling in the annealing process, hot-dip zinc alloy plating is performed on the cold-rolled steel sheet.

10. The method of manufacturing a steel sheet according to claim 8, wherein during cooling in the annealing process, alloying is performed after the hot-dip galvanizing.

11. The steel sheet according to claim 5, wherein a Fe content in the zinc alloy plated layer is 7.0% to 13.0% by mass %.

12. The method of manufacturing a steel sheet according to claim 9, wherein during cooling in the annealing process, alloying is performed after the hot-dip zinc alloy plating.

* * * * *